(12) United States Patent
Kitamura

(10) Patent No.: US 7,441,096 B2
(45) Date of Patent: Oct. 21, 2008

(54) HIERARCHICAL STORAGE MANAGEMENT SYSTEM

(75) Inventor: Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/886,892

(22) Filed: Jul. 7, 2004

(65) Prior Publication Data

US 2006/0010169 A1    Jan. 12, 2006

(51) Int. Cl.
*G06F 12/10* (2006.01)
(52) U.S. Cl. .................. 711/203; 711/161; 711/162; 711/202
(58) Field of Classification Search ......... 711/161–162, 711/202, 203, 204, 205, 206, 207, 208
See application file for complete search history.

(56) References Cited

U.S. PATENT DOCUMENTS

| | | | |
|---|---|---|---|
| 6,094,680 A * | 7/2000 | Hokanson | 709/223 |
| 6,237,063 B1 | 5/2001 | Bachmat et al. | |
| 6,502,106 B1 | 12/2002 | Gampper et al. | |
| 6,757,778 B1 | 6/2004 | van Rietschote | |
| 6,804,719 B1 | 10/2004 | Cabrera et al. | |
| 7,035,993 B2 * | 4/2006 | Tai et al. | 711/206 |
| 2004/0039891 A1 * | 2/2004 | Leung et al. | 711/165 |
| 2005/0021566 A1 * | 1/2005 | Mu | 707/200 |
| 2005/0097126 A1 | 5/2005 | Cabrera et al. | |
| 2005/0216532 A1 * | 9/2005 | Lallier | 707/204 |

OTHER PUBLICATIONS

"IBM Tivoli Storage Management Concepts" IBM Redbook, IBM Corporation White Plains NY (May 2003).
"Summary of the HSM Client," in *IBM Tivoli Storage Manager for Space Management for UNIX, Users Guide Version 5 Release 2*, Chapter 1, pp. 1-4, IBM Corporation White Plains NY (Dec. 2003).

* cited by examiner

*Primary Examiner*—Matt Kim
*Assistant Examiner*—Hetul Patel
(74) *Attorney, Agent, or Firm*—Townsend and Townsend and Crew LLP

(57) ABSTRACT

A hierarchical storage system comprises a host computer and a storage system. The storage system comprises at lease two kinds of storage devices, a first tier storage and a second tier storage. The first tier storage is a high performance (or high cost) storage device, and the second tier storage is a lower performance (or lower cost) storage device. The storage system creates a virtual volume based on the first and second tier storages, and enables the host computer to access the virtual volume. A file system in the host computer knows which region of the virtual volume corresponds to the first tier storage and which region of the virtual volume corresponds to the second tier storage. When the file system receives a command to migrate a file from the first tier to the second tier storage, e.g., from a user, the file system examines the address information of the virtual volume where the file resides, and instructs the storage system to migrate the blocks of the designated addresses.

34 Claims, 19 Drawing Sheets

| 171 | 172 | 173 |
|---|---|---|
| File name | I-node number | Last access time |
|  |  |  |
|  |  |  |
|  |  |  |

| TIER | CAPACITY |
|---|---|
| 1 | 75 |
| 2 | 40 |

|  | THRESHOLD |
|---|---|
| CAPACITY | 75 |
| TIME | 365 DAYS |

| VIRTUAL VOLUME | | LOGICAL VOLUME | | |
|---|---|---|---|---|
| HEAD | TAIL | VOL# | HEAD | TAIL |
| 0x00000000 | 0x0001af0f | 0 | 0x00000000 | 0x0001af0f |
| 0x0001af10 | 0x0001ffff | 1 | 0x00000000 | 0x000050ef |
| 0x00020000 | 0x00020fff | 0 | 0x00020000 | 0x00020fff |
| 0x00021000 | 0x0008ffff | 1 | 0x000050f0 | 0x000740ef |
| ⋮ | ⋮ | ⋮ | ⋮ | ⋮ |

| BLOCK | FLAG |
|---|---|
| 0 | 1 |
| 1 | 1 |
| 2 | 1 |
| 3 | 1 |
| ⋮ | ⋮ |
| k | 0 |
| | |

HIERARCHICAL STORAGE MANAGEMENT SYSTEM

BACKGROUND OF THE INVENTION

The present invention relates to a storage system, in particular to management of a hierarchical storage system.

Recently, the amount of data that is treated in the information systems has been increasing tremendously; therefore, the amount of storage needed by a company or organizations is also increasing. As with other sizeable business expense, it is desirable to reduce the cost of managing and maintaining a storage system. Hierarchical Storage Management (HSM) has been put forth to reduce such a cost. HSM system manages multiple kinds of storage devices, e.g., some are high performance and/or reliable devices that are relatively expensive and others are low performance devices that are less expensive.

In such a HSM system, important data are generally stored on the high performance and high cost storage while less important data are stored on the low performance and low cost storage. Since the importance of data tends to decrease over time, data are moved between the high performance storage to the low cost storage over time.

IBM Redbook SG-24-4877-03 "IBM Tivoli Storage Management Concepts", pp. 151-158 discloses the concept of HSM function of IBM Tivoli Storage Manager for Storage Management ("TSM"), which is the storage management software of IBM. For example, TSM automatically migrates the least-recently used files to the lower cost storage media, and the "stub file" is placed in the original location of the migrated files. If user tries to access the migrated file, TSM retrieves the contents of the migrated file from the lower cost storage media based on the information in the stub file. This migration and retrieval operations are done by the IBM Tivoli storage Manager for Storage Management.

One problem of TSM is that the file migration operation is performed primarily by the TSM, i.e., the central processing unit ("CPU") of a host computer. This may put a significant burden on the CPU. Another problem is that if TSM attempts to find a migrated file, it first finds the stub file based on the file/directory name information provided by the user, and then checks the contents of the stub file, and finally accesses the migrated file. That is, TSM performs two search operations: (1) stub file search and (2) migrate file search.

U.S. Pat. No. 6,237,063 discloses a method for exchanging the physical locations of the logical volumes, so that the workload of the physical disk drives can be equalized. The location exchange of each logical volume is performed transparently from the host computers.

One problem of the above method is that it exchanges the location only based on the access statistics of the logical volumes or physical disks. For instance, as a result of the exchange, important data may accidentally be migrated to the low-cost storage. Alternatively, unimportant/unused data may be migrated to the high-performance storage. Therefore, this method provides somewhat unpredictable data migration results.

BRIEF SUMMARY OF THE INVENTION

The present invention relates to a hierarchical storage system including a plurality of storage device types and a method of managing data within such a system. The present invention, among other features, enables data migration at the file level rather than at the volume level, i.e., file-level migration is possible. In one implementation, the data migration is performed largely by a joint effort between a host computer and a storage system. In another implementation, the migration is done primarily at the storage system level with minimal involvement by the host.

In one embodiment, a hierarchical storage system comprises a host computer and a storage system. The storage system comprises at lease two kinds of storage devices, a first tier storage and a second tier storage. The first tier storage is a high performance (or high cost) storage device, and the second tier storage is a lower performance (or lower cost) storage device. The storage system creates a virtual volume based on the first and second tier storages, and enables the host computer to access the virtual volume. A file system in the host computer knows which region of the virtual volume corresponds to the first tier storage and which region of the virtual volume corresponds to the second tier storage. When the file system receives a command to migrate a file from the first tier to the second tier storage, e.g., from a user, the file system examines the address information of the virtual volume where the file resides, and instructs the storage system to migrate the blocks of the designated addresses.

In one embodiment, a method for managing a hierarchical storage system is disclosed. The hierarchical storage system includes a first storage unit, the first storage unit including a storage area to store data, a storage controller to control access to the storage area, and a communication interface to communicate with a file server. The method comprises receiving an instruction to migrate a first file stored in a first portion of a first tier storage region defined by one or more first tier physical storage devices; determining a first storage address corresponding to the first portion of the first tier storage region; and copying data stored at the first storage address to a second portion of a second tier storage region defined by one or more second tier physical storage devices. The first and second tier physical storage devices provide different performance characteristics. The first tier storage region includes a second file that remains in the first tier storage region and is not migrated to the second tier storage region.

In another embodiment, a hierarchical storage system comprises a storage unit, the first storage unit including a storage area defined by a plurality of disks and a storage controller to control access to the storage area; and a file server coupled to the storage unit via a communication interface and configured to issue requests to the storage unit. The storage unit includes means for receiving a request from the file server to migrate a first file stored in a first portion of a first tier storage region defined by one or more first tier disks; means determining a first storage address corresponding to the first portion of the first tier storage region; and means for copying data stored at the first storage address to a second portion of a second tier storage region defined by one or more second tier physical storage devices. The first and second tier physical storage devices provide different performance characteristics. The first tier storage region includes a second file that remains in the first tier storage region and is not migrated to the second tier storage region.

In another embodiment, a disk array unit includes a storage area defined by a plurality of storage disks; a storage controller to manage the storage disks and communicate with a remote computer via a communication interface, the remote computer configured to issue access requests to the disk array unit; means for receiving an instruction to migrate a first file stored in a first virtual region of a virtual volume, the first virtual region being mapped to a first logical volume that is defined by one or more physical storage devices of first type; means for migrating the first file to a second logical volume, the second logical volume being mapped to a second virtual region of the virtual volume; and means for updating metadata of the virtual volume to reflect the migration of the first file to the second logical volume. The first virtual region includes a second file that remains therein and is not migrated to the second virtual region with the first file.

As used herein, the term "storage system" refers to a computer system configured to store data and includes one or more storage units or storage subsystems, e.g., disk array units (also referred to as disk storage). Accordingly, the storage system may refer to a computer system including one or more hosts and one or more storage subsystems, or only a storage subsystem, or a plurality of storage subsystems coupled to a plurality of hosts via a communication link that may be a storage area network, a local area network, wide area network, a cable, wireless, or the like.

As used herein, the term "storage subsystem" refers to a computer system that is configured to store data and includes a storage area and a storage controller for handling requests from one or more hosts via a communication link that may be a storage area network, a local area network, wide area network, a cable, wireless, or the like. The storage subsystem may be referred to as a storage device, storage unit, storage disk, disk array unit, storage apparatus, or the like.

As used herein, the term "file server" refers to a computer system that is coupled to one or more storage subsystems and is configured to send read or write requests to the storage subsystems. The file server may be provided within the same housing as the storage subsystem or remotely located from the storage subsystem.

As used herein, the term "logical volume" refers to a storage region or area that is defined using one or more physical storage devices, e.g., disks or tapes.

As used herein, the term "virtual volume" refers to a storage region or area that is defined using one or more logical volumes.

As used herein, the term "data block" refers to a unit in which data is written and read from a storage area or device. A data block is generally an atomic unit of data recognition that is written or read in a single sequence.

As used herein, the term "file" refers to an abstract data object made up of an ordered sequence of data bytes stored on a storage area or device or a symbolic name by which a data object is identified. A file may include one or more data blocks.

BRIEF DESCRIPTION OF THE DRAWINGS

FIG. 7 illustrates a file management table according to one embodiment of the present invention.

FIG. 8 illustrates threshold information according to one embodiment of the present invention.

FIG. 12 illustrates a virtual volume mapping table according to one embodiment of the present invention.

FIG. 13 illustrates a logical volume bitmap according to one embodiment of the present invention.

DETAILED DESCRIPTION OF THE INVENTION

Figure 1:
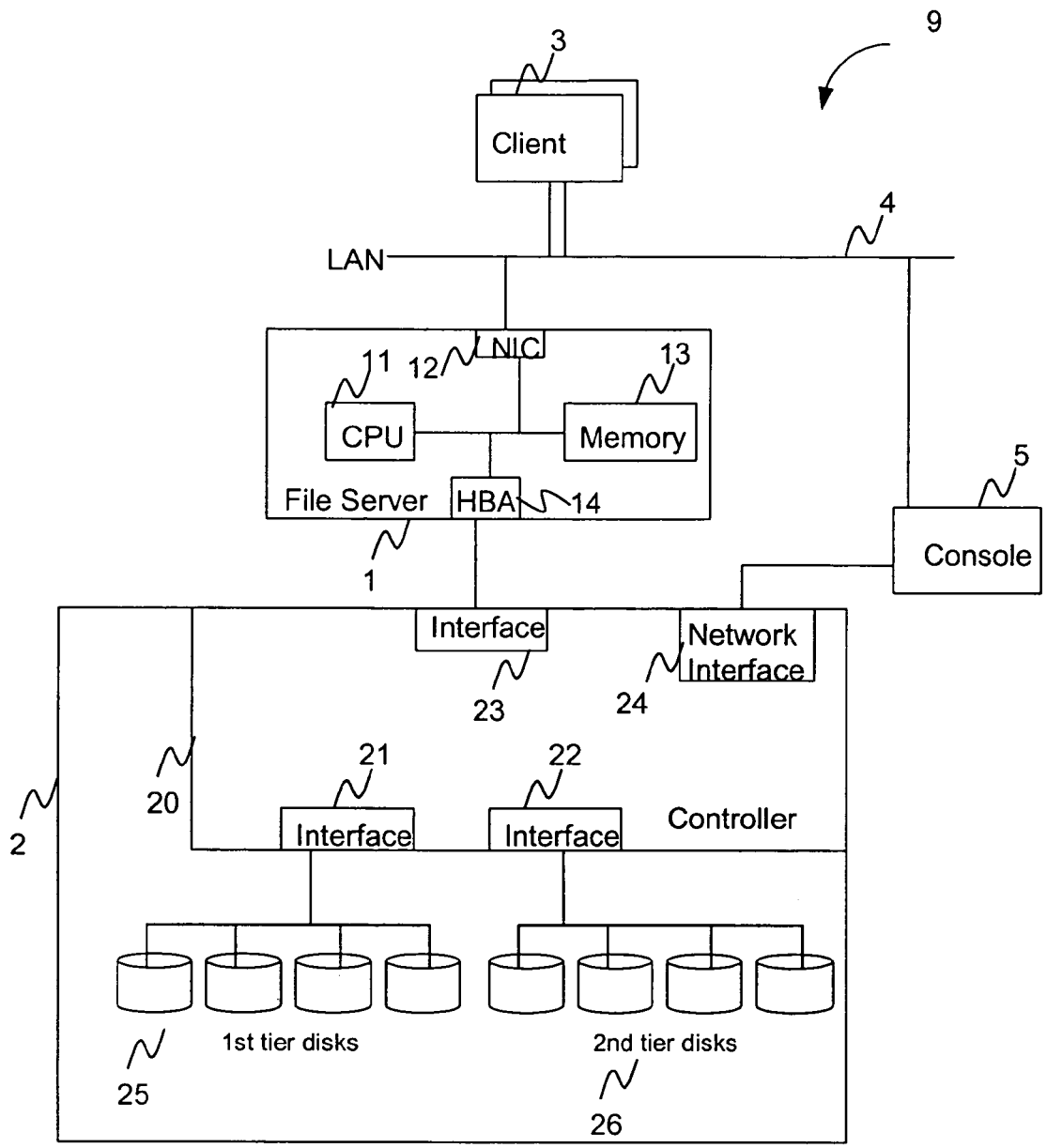
FIG. 1 illustrates a hierarchical storage management (HSM) system according to one embodiment of the present invention.

FIG. 1 illustrates a hierarchical storage management (HSM) system 9 according to one embodiment of the present invention. HSM system 9 may also be referred to as a hierarchical storage system or simply a storage system. The HSM system 9 is composed of a file server 1, a storage subsystem 2, client computers 3, and a console 5. The file server 1 may be a host computer that is remotely located from the storage subsystem. Alternatively, the file server 1 may be enclosed within the same housing as the storage subsystem 2. The storage subsystem 2 is storage apparatus having a large storage area and a storage controller. The storage subsystem 2 may be a disk storage or disk array unit having a plurality of disk drives that is controlled or managed by a storage controller. For convenience, the storage subsystem 2 is generally referred to as a disk storage 2 herein below.

File server 1 includes a CPU 11, a network interface controller (NIC) 12, a memory 13, and a host bus adapter (HBA) 14. File server 1 is connected to disk storage 2 via HBA 14. File server 1 is also connected via NIC 12 with other host computers, such as client computers 3. CPU 11 and memory 13 are used to run some of the programs for realizing hierarchical storage management.

Disk storage 2 comprises a disk controller 20 (also referred to as "storage controller"), one or more disks of first type 25

(or first tier disks or first disks), and one or more disks 26 of second type (or second tier disks or second disks). Disk controller 20 comprises a plurality of storage interfaces ("interfaces") 21, 22, and 23, and a network interface 24. First tier disks 25 are connected to the disk controller 20 via interface 21, and second tier disks 26 are connected to the disk controller 20 via interface 22. Interface 23 is used to connect the disk storage 2 to file server 1. Also, console 5 is connected to the disk storage 2 via network interface 24. The console 5 is used to perform administrative functions by an administrator. The console 5 may be referred to as a service processor.

In the present embodiment, first tier disks 25 are the hard disk drives that are coupled to a Fibre Channel (FC) interface. That is, interface 21 is a Fibre Channel interface. Second tier disks 26 are lower cost hard disk drives relative to the first tier disks 25, such as ATA hard disk drives (ATA-HDDs). Accordingly, interface 22 is an ATA interface, or a Fibre Channel interface if the second tier disks 26 are coupled with the FC-ATA interface converters.

The disk controller also includes a CPU (not shown), a memory (not shown) and programs (FIG. 2) to perform hierarchical storage management therein.

Figure 2:
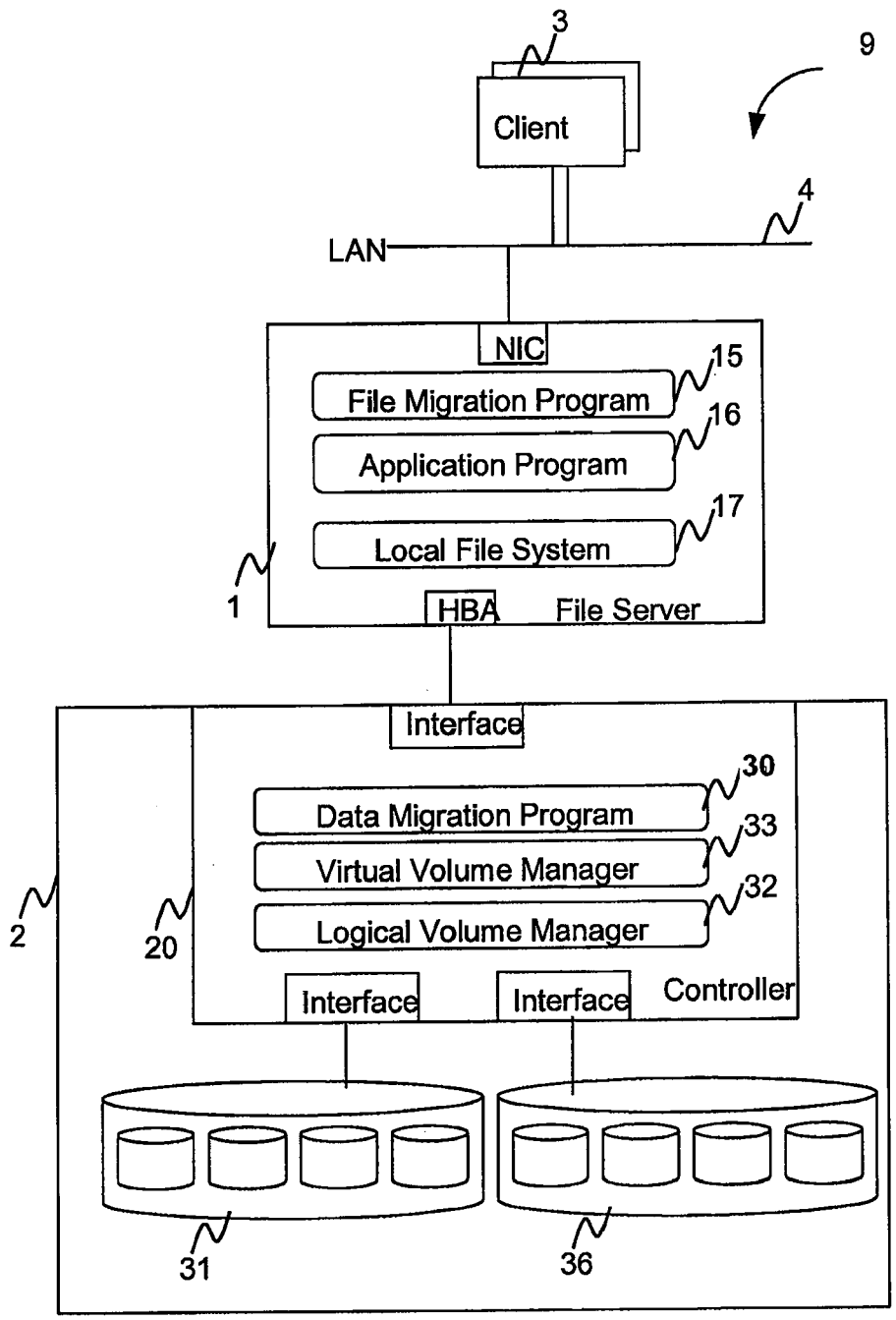
FIG. 2 illustrates a functional diagram of the HSM system of FIG. 1 according to one embodiment of the present invention.

FIG. 2 illustrates a functional diagram of the HSM system 9 of FIG. 1 according to one embodiment of the present invention. File server 1 includes a file migration program 15, application program 16, and local file system 17. Local file system 17 is configured to receive and process file access requests from application program 16, and store the file to the disk storage 2. Application program 16 may be any program that uses files that are managed by local file system 17. For example, application program 17 may be a word processing application, a type of database management system (DBMS), or a network file server program, such as NFS or CIFS server, receiving file access requests from the client/hosts 3. File migration program 15 is configured to receive file migration requests from application program 16 or client hosts 3, and execute the migration operation using local file system 17. In some implementations, the file migration program 15 may be implemented in the local file system 17.

Disk controller 20, provided in the disk storage 2, includes data migration program 30, logical volume manager 32, and virtual volume manager 33. Logical volume manager 32 is operable to create one or more logical volumes using first tier disks 25 or second tier disks 26, as explained in more details below. Virtual volume manager 33 is operable to create one or more virtual volumes using the logical volumes. The relation between logical volumes and virtual volumes is explained below. Data migration program 30 is operable to migrate data blocks between the logical volumes in accordance with the requests from the logical volume manager 32.

Figure 3:
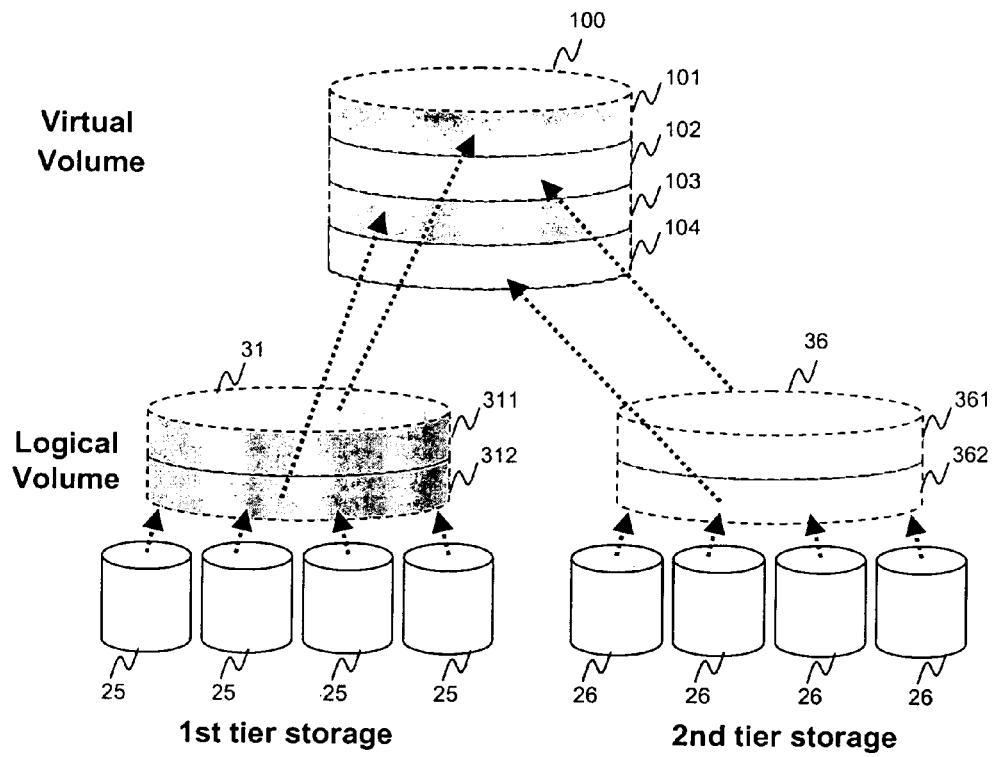
FIG. 3 illustrates a logical relationship among first and second tier disks, logical volumes, and virtual volumes according to the present embodiment.

FIG. 3 illustrates a logical relationship among first and second tier disks, logical volumes, and virtual volumes according to the present embodiment. In the present embodiment, first tier disks 25 are Fibre Channel interface Hard Disk Drives (FC-HDDs), and second tier disks 26 are lower-cost and lower-performance hard disk drives when compared to first tier disks 26, e.g., ATA Hard Disk Drives (ATA-HDDs). The logical volumes sit on top of these physical disks. The virtual volume, in turn, sits on top of the logical volume.

Logical volume manager 32 creates at least two logical volumes 31 and 36. Logical volume 31 comprises first tier disks 25, and logical volume 36 comprises second tier disks 26. Although FIG. 3 shows only two logical volumes (volumes 31 and 36), logical volume manager 32 may create a plurality of logical volumes of first type (corresponding to volume 31) and a plurality of logical volumes of second type (corresponding to volume 36). In some implementations, to increase reliability, disk storage 2 adopts Redundant Arrays of Inexpensive Disks (RAID) technique, and one or more first tier disks 25 and one more second tier disks 26 contain redundant data, such as parity.

Virtual volume manager 33 creates virtual volume 100 using the logical volumes 31 and 36. From the perspective of file server 1, it can only see the virtual volume 100 and cannot see the logical volumes 31 and 36 nor the first and second tier disks 25 or 26. A first region 311 of the logical volume 31 is mapped to a first region 101 of the virtual volume 100, and a second region 312 of the logical volume 31 is mapped to a third region 103 of the virtual volume 100. A first region 361 of the logical volume 36 is mapped to a second region 102 of the virtual volume 100, and a second region 362 of the logical volume 36 is mapped to a fourth region 104 of the virtual volume 100.

Figure 4:
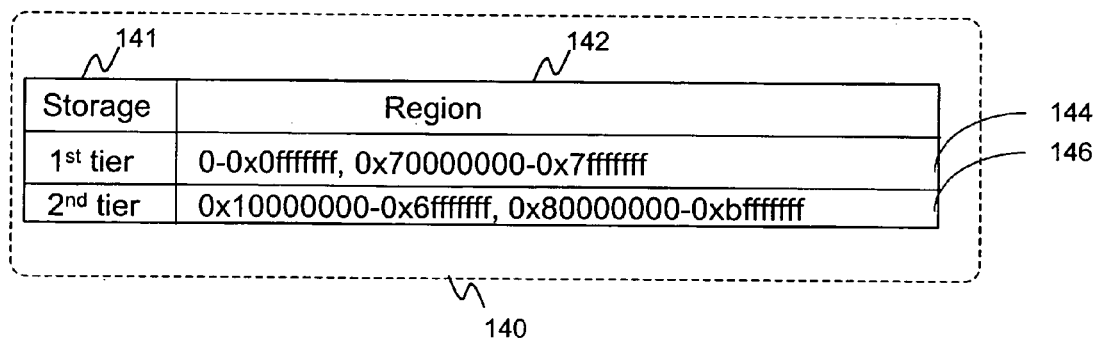
FIG. 4 illustrates a virtual volume mapping table for virtual and logical volumes according to one embodiment of the present invention.

FIG. 4 illustrates a virtual volume mapping table 140 corresponding to the above logical relationship amongst the various storage volumes (virtual and logical volumes) according to one embodiment of the present invention. The virtual volume mapping table 140 is managed in the disk storage 2 in the present embodiment. Local file system 17 of the file server 1 may retrieve the mapping information from the table 140 via the interface 23 or network interface 24 to determine which data blocks in the virtual volume 100 are mapped to logical volume 31 and which are mapped to logical volume 36.

In table 140, a column 141 indicates the storage tier of the disks and a column 142 indicates regions of data blocks in the virtual volume that are mapped to the first and second tier disks. An entry or record 144 indicates that the data blocks in the virtual volume 100 whose logical block addresses (LBAs) are between 0x00000000 and 0x0fffffff, and between 0x70000000 and 0x7fffffff are mapped to the first tier storage region (i.e. logical volume 31 or first tier disks 25). An entry or record 146 indicates that the data blocks in the virtual volume 100 whose LBAs are between 0x10000000 and 0x6fffffff, and between 0x80000000 and 0xbfffffff are mapped to the second tier storage region (i.e. logical volume 36 or second tier disks 26).

Table 140 is created for each virtual volume that has been defined by an administrator or user. When an administrator uses console 5 to instruct the disk storage 2 to create a virtual volume, table 140 is created and along with the mapping information. This mapping information is updated periodically as needed.

If logical volumes or regions of the logical volumes that have not been mapped to the virtual volume 100 exist, virtual volume 100 can be expanded by adding the unmapped regions (or logical volumes) to the virtual volume. For example, the third region 103 may be a region that has been added/mapped to the virtual volume after the virtual volume have been defined with the first and second regions 101 and 102. Similarly, the fourth region 104 may be a region that has been added/mapped the third region. A region that is added/ mapped to the virtual volume may be an entire logical volume or a portion thereof.

Figure 5:
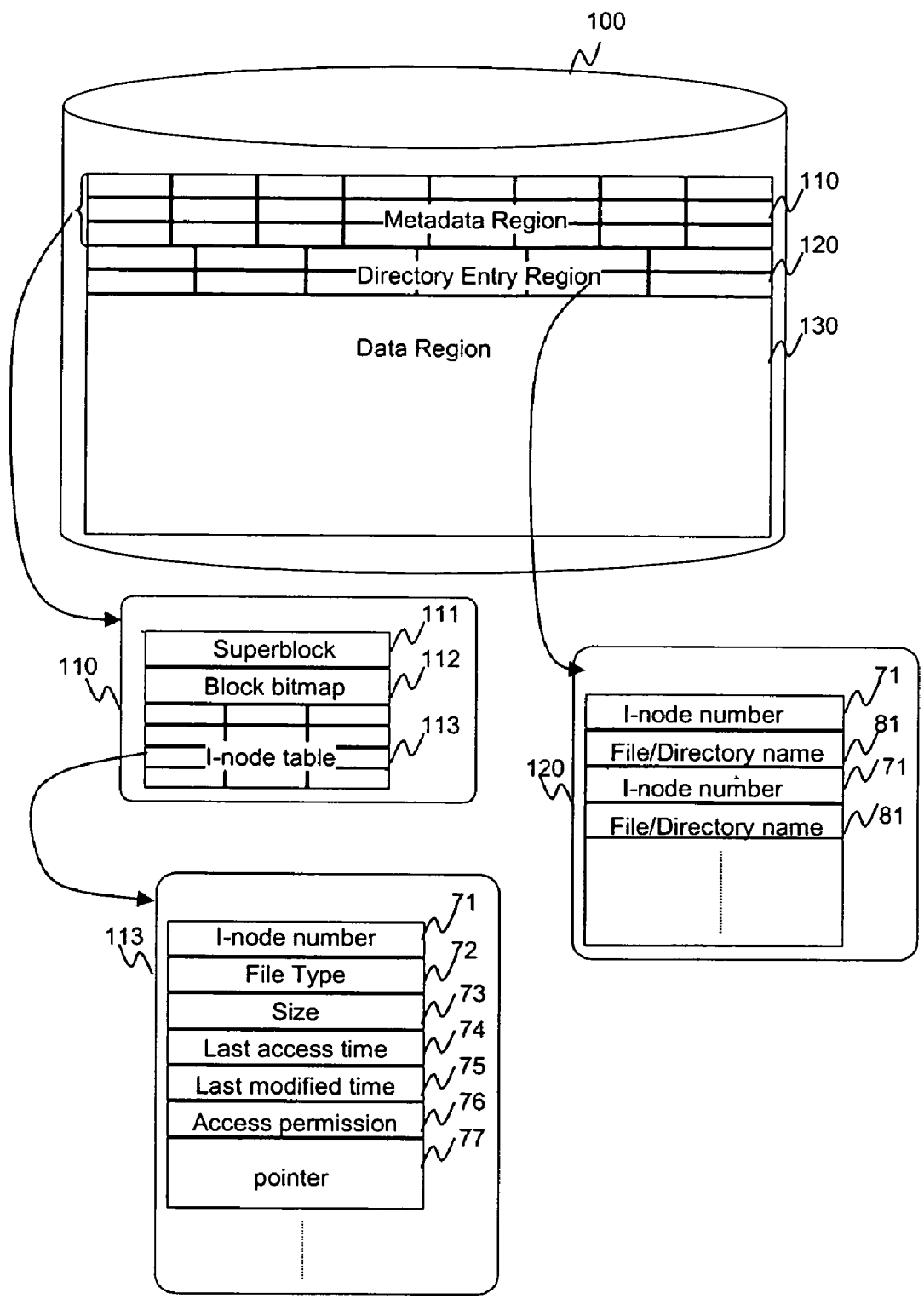
FIG. 5 illustrates data structure as stored in a virtual volume according to one embodiment of the present invention.

FIG. 5 illustrates the structure of data stored in the virtual volume 100 according to the present embodiment. These data are accessed by local file system 17. Local file system 17 creates three kinds of storage regions in the virtual volume: a metadata region 110, a directory entry region 120, and a data region 130.

Metadata region 110, in turn, includes three sub-regions: a superblock 111, a block bitmap 112, and an i-node table 113. In superblock 111, local file system 17 stores the location information of i-node table 113 or others. Block bitmap 112 is the information that shows which data blocks are in use or which data blocks are not in use. I-node table 113 is the area for storing i-nodes of the file system. Each i-node has file attributes of each file. These attributes relate to the location of a data block in a file, the size of the file, and other administrative information.

For example, an i-node includes i-node number 71 that is assigned to the i-node. Each i-node has a unique number or identifier in the file system. File type 72 is used to distinguish directory from file. Size 73 indicates the size of the file. Last access time 74 indicates the time the file was last accessed based on the time recorded by local file system 17. Last modified time 75 indicates the time the file was last modified. Access permission 76 stores the file attribute, e.g., read-only, executable, and so on. Pointer 77 is used to record the file location information. If a file is stored in a plurality of disk blocks (e.g., ten), the addresses of the ten disk blocks are recorded in the pointer 77. The addresses are expressed as logical block address (LBA) of virtual volume 100.

Referring back to the three regions of the virtual volume, directory entry region 120 contains the information about each directory in the file system. Each directory is composed of a set of files and directories. Each directory entry contains all of the i-node numbers 71 and the file/directory names 81 that are stored in the directory. Data region 130 stores the actual data.

In the present embodiment, the metadata region 110 and directory entry region 120 are together referred to as "metadata". When the local file system 17 creates a file, it creates the i-node of the file at the same time the data is written to the virtual volume 100.

In the present embodiment, since local file system 17 and the file migration program 15 may retrieve the information in the virtual volume mapping table 140, local file system 17 knows which region in the virtual volume 100 is mapped to which tier of the storage (first tier storage or second tier storage). By using this mapping information, local file system 17 first writes the data to the regions in the virtual volume that map to the first tier storage regions of the disk storage 2. Thereafter, once the data or file becomes less important, it is migrated to the second tier storage region in accordance with a file migration request, which may be made by a user or automatically generated by a program.

Figure 6:
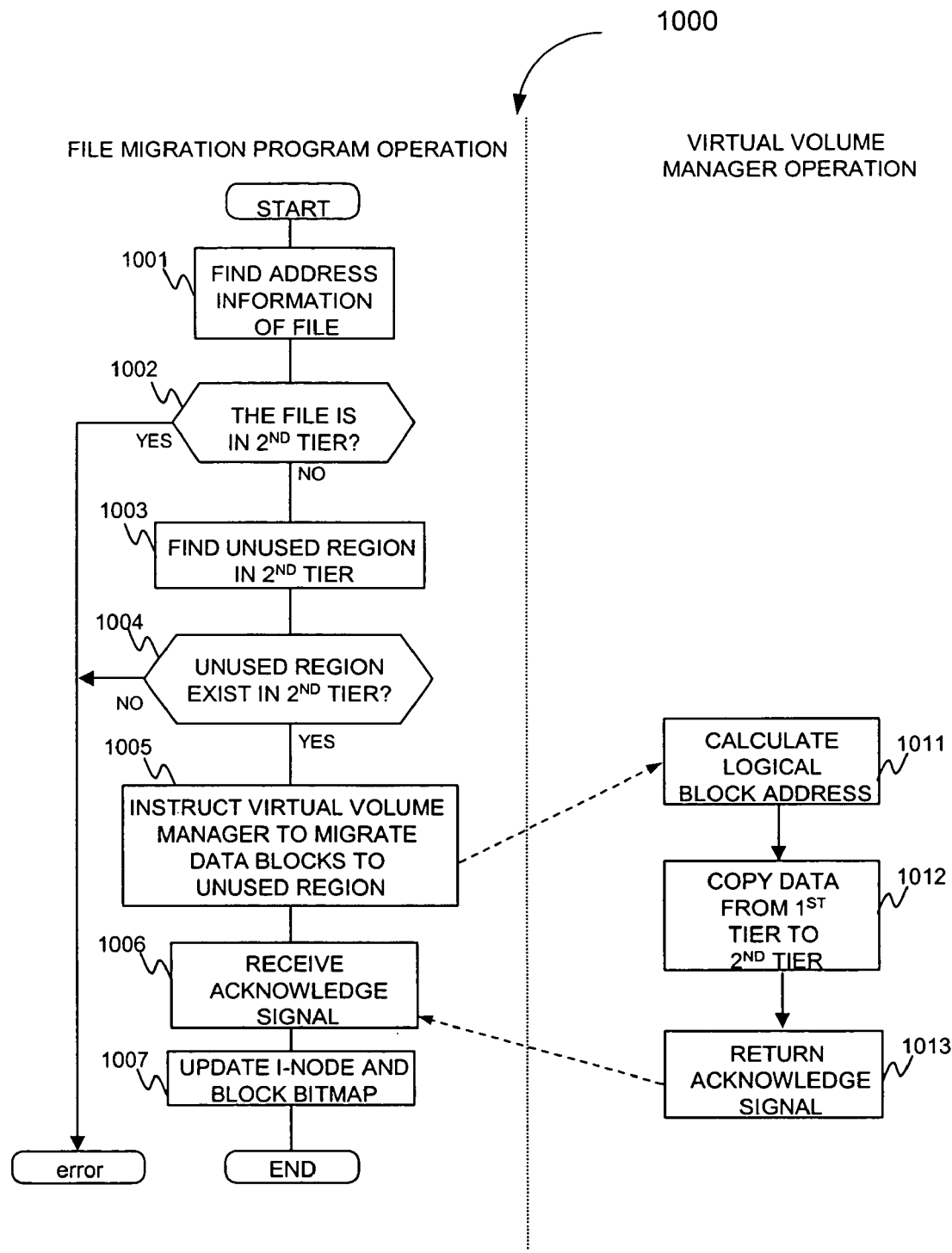
FIG. 6 illustrates a process for migrating a designated file from the first tier storage region to the second tier storage region according to one embodiment of the present invention.

FIG. 6 illustrates a process 1000 for migrating a designated file from the first tier storage region to the second tier storage region according to one embodiment of the present invention. The process involves file migration program 15 and virtual volume manager 33. Steps 1001-1007 are the steps that are executed by the file migration program 15, and steps 1011-1013 are the steps that are executed by the virtual volume manager 33.

At step 1001, file migration program 15 receives an instruction to migrate a file. The instruction includes the name of the file that has been selected or designated for migration. File migration program 15 searches the metadata for the i-node of the designated file. If the i-node is found, file migration program 15 checks the pointer 77 to find the block addresses in the virtual volume 100 of the file. The i-node may include a plurality of block addresses since the file may be stored into one or more data blocks.

File migration program 15 checks whether or not the file is already in the second tier storage region by comparing the block addresses of the file and mapping information stored in the virtual volume mapping table 140 (step 1002). If the file is already in the second tier storage region, file migration program 15 returns an error message to application program 16 or the user. Otherwise, process 1000 proceeds to step 1003.

At step 1003, file migration program 15 examines block bitmap 112 to locate unused data blocks in the second tier storage region. A determination is made as to whether or not there is an unused data block of sufficient capacity (step 1004). If exist, the process proceeds to step 1005. Otherwise, file migration program 15 returns an error message to application program 16 or users.

At step 1005, file migration program 15 instructs (or sends a request to) virtual volume manager 33 to migrate the designated file that is stored in one or more data blocks of the first tier storage region to the second tier storage region, i.e., to a region 361 or 362 of the logical volume 36, by specifying the block addresses of the first tier storage region in the virtual volume where the file is stored and the block addresses of the second tier storage region in the virtual volume where the file is to be migrated. Thereafter, program 15 receives an acknowledgement from the virtual volume manager 33 that the migration process has been completed (step 1006). File migration program 15 instructs the local file system 17 to update pointer 77 of the i-node and block bitmap 112, so that they would correspond to the new storage location in the second tier region wherein the designated file has been migrated (step 1007).

Referring back to step 1005, when virtual volume manager 33 receives the migration request from file migration program 15, the virtual volume manager 33 determines the block address of the logical volume wherein the file currently resides (hereinafter referred to as "source location address"), and the block address of the logical volume wherein the file is to be migrated (hereinafter referred to as "destination location address") based on virtual volume management table 140 (step 1011).

At step 1012, virtual volume manager 33 instructs data migration program 30 to copy the data from the source location to the destination location. Data migration program 30 copies the data by instructing logical volume manger 32 to read the data from the source location and then write them to the destination location. Since the source and destination location addresses are the addresses in the logical volumes, the logical volume manager 32 converts the source and destination location addresses into the addresses of the first and second tier disks 25 and 26, and executes the copy operation. Virtual volume manager 33 sends an acknowledgement to the file migration program (step 1013).

Process 1000 described above in connection with FIG. 6 relates to a manual file migration method that is invoked by a user or the application programs 16. In other implementations, the HSM system migrates a file automatically. This automatic process this described using FIGS. 7-9 below.

FIG. 7 illustrates a file management table 170 according to one embodiment of the present invention. This table is created by file migration program 15. Each row or entry of the table provides information on a file that is stored in virtual volume 100. The table includes a file name 171, i-node number 172, and last access time 173, which correspond to the information stored in the metadata of the virtual volume 100. The difference between the file management table 170 and metadata is that the file management table only manages the information of the files that are stored in the first tier storage region, and that the rows in file management table 170 are sorted based on the order of the last access time 173. In one implementation, the first row includes the information on the least recently accessed file, and the last row includes the information on the most recently accessed file.

The file migration program 15 updates the file management table 170 after a file is accessed the disk storage 2. When the local file system writes a file to the disk storage 2, it provides the file migration program 15 with the file name 171, the i-node number 172, and the access time 173. File migration program 15 registers the information in the file management table 170. When the file is read from the disk storage 2, the last access time 173 is updated.

FIG. 8 illustrates threshold information 150 according to one embodiment of the present invention. Threshold information 150 is managed by file migration program 15 in the present embodiment. Tier 151 indicates the tier of the storage. Capacity 152 shows the usage of the first and second tier storages. For example, a first row or record 154 indicates 75% of the first tier storage is being used. A threshold column 153 indicates the threshold point at which file migration program 15 starts the file migration operation. A first row 156 indicates the capacity threshold, and a second row 158 indicates the time threshold. The details of how these thresholds are used in the migration operation are described below.

Figure 9:
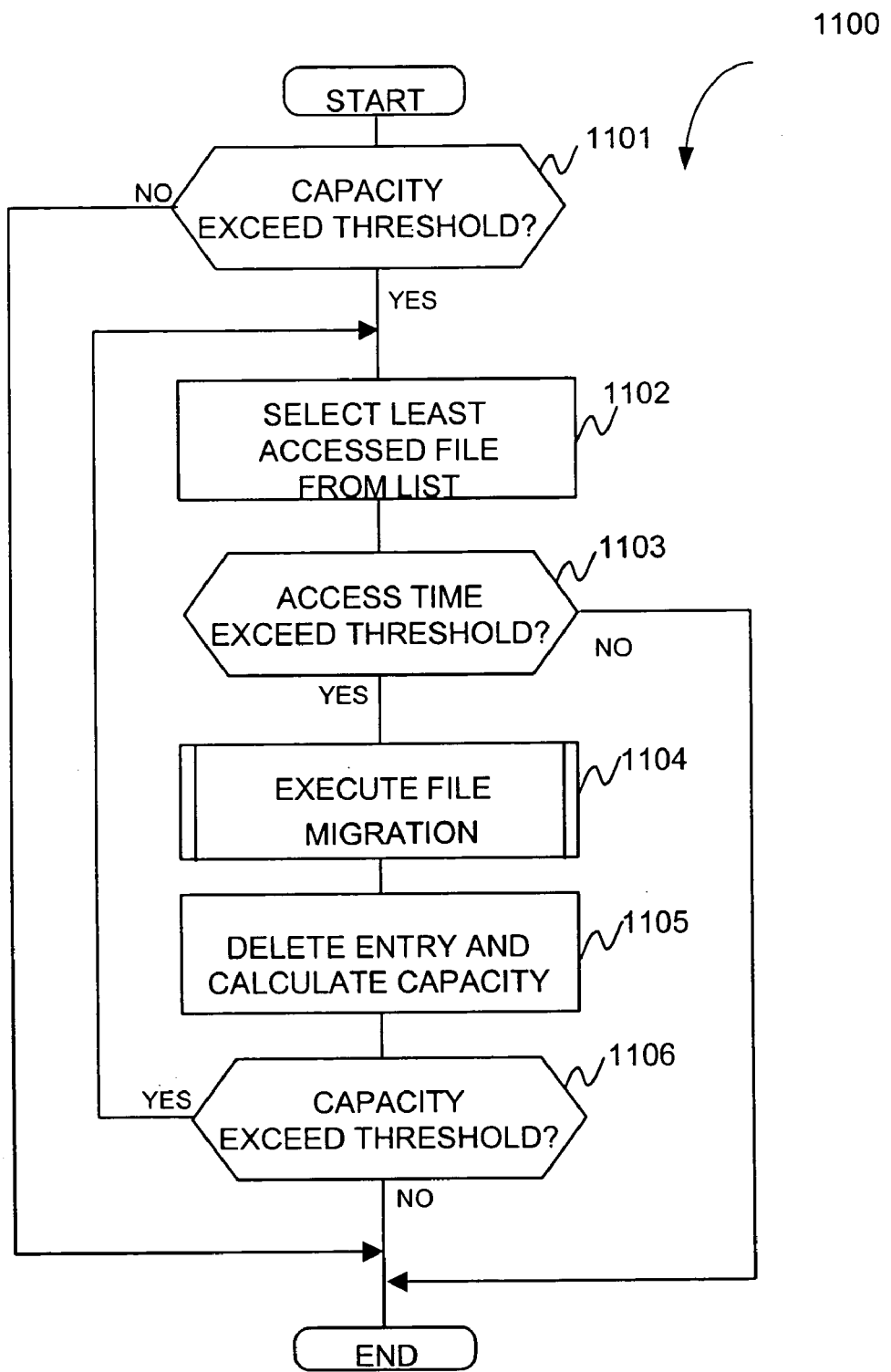
FIG. 9 illustrates a process for automatically migrating a file according to one embodiment of the present invention.

FIG. 9 illustrates a process 1100 for automatically migrating a file according to one embodiment of the present invention. File migration program 15 periodically (e.g., once a day or once a week) executes process 1100 in the present embodiment. At step 1101, file migration program 15 determines whether or not the capacity 152 in the first tier storage region has reached or exceeded the capacity threshold 156. In table 150, as illustrated, the capacity 152 is 75% and the threshold 156 is 75%, so the process proceeds to step 1102. If the capacity 152 is below the threshold 156, the process is terminated.

At step 1102, file migration program 15 selects a file that has been accessed the least recently. This file is one in the first row of table 170 in the present implementation. File migration program 15 checks whether or not the selected file (i.e., the least recently accessed file) exceeds the time threshold 158 (step 1103). In the present example, if the selected file has not been accessed for 365 days or more, the process proceeds to step 1104 since the time threshold 158 is 365 days (see FIG. 8). Otherwise, the process ends.

At step 1104, file migration program 15 executes the file migration process, which corresponds to process 1000 of FIG. 6. After the file migration has been executed, file migration program 15 deletes the entry of the migrated file and recalculates the capacity usage of the first tier storage region (step 1105). The result of recalculation is stored in the column 152 in the table 150.

At step 1106, file migration program 15 determines whether or not the recalculated capacity 152 still exceeds the capacity threshold 156. If so, process 1100 returns to step 1102 and attempts to migrate another file, i.e., the second least recently accessed file. Otherwise, the process ends.

Process 1100 above is merely one example of an automatic file migration operation. In another implementation, the automatic file migration operation may only check the capacity threshold or the time threshold. Alternatively, there may be another policy or threshold value to decide whether or not to perform the file migration.

Figure 10:
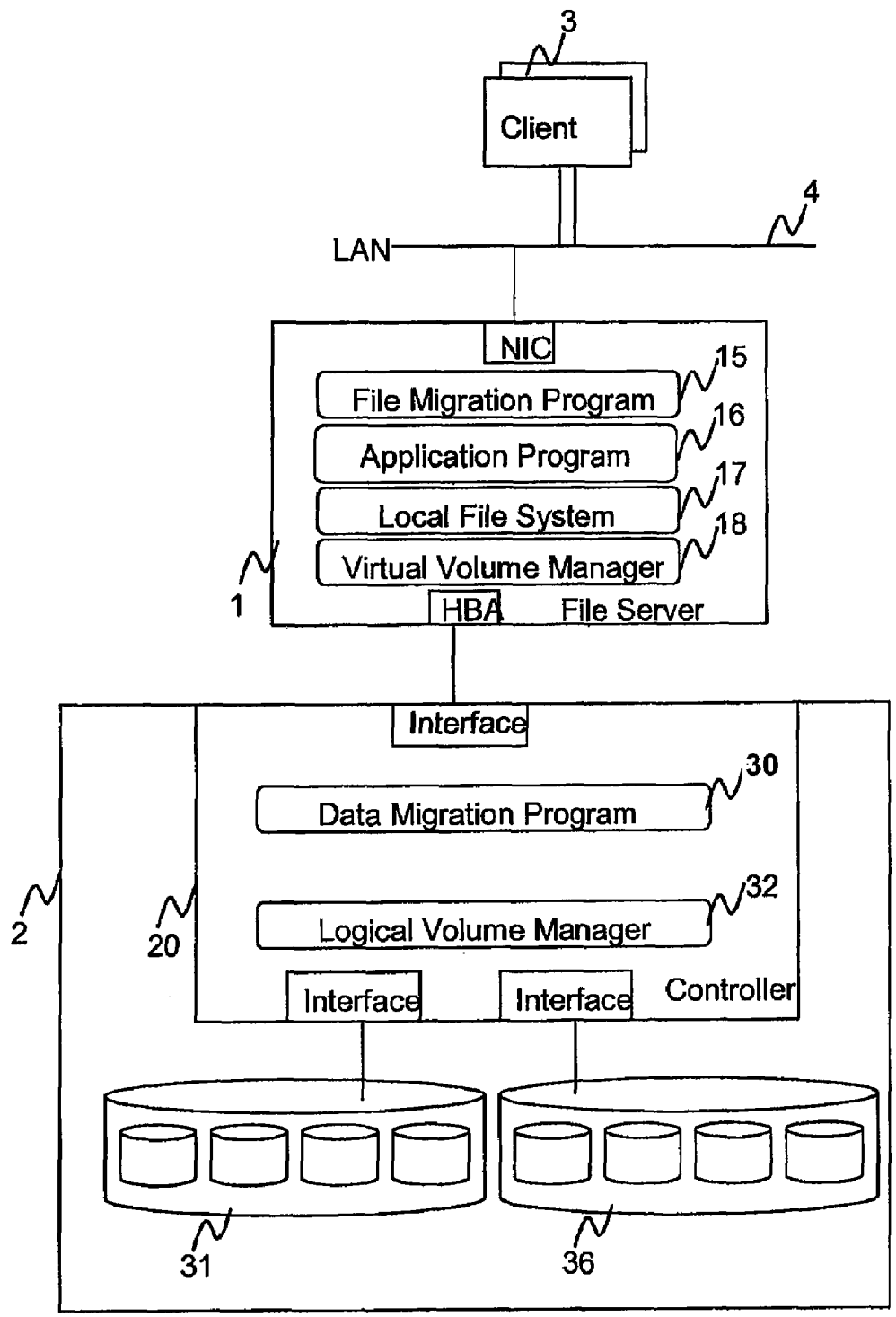
FIG. 10 illustrates a virtual volume manager provided in a file server according to one embodiment of the present invention.

In the present embodiment, virtual volume manager 33 exists in disk storage 2. However, the virtual volume manager may be provided in file server 1, as illustrated in FIG. 10.

In the embodiments above, local file system 17 knows which data block addresses in the virtual volume 100 are mapped to which storage tiers, first tier or second tier. When a file is migrated from the first tier storage to the second tier storage, the local file system itself designates the new file location, which is conveyed to the virtual volume manager.

In the embodiments below, the local file system 17 is not involved in such matters. That is, the local file system 17 does not know to which storage tier each data block in the virtual volume 100 belongs. The HSM system 9 configuration is substantially the same as in FIGS. 1 and 2, but the roles of local file system 17 and virtual volume manager 33 have been modified to some extent in the embodiments below.

Figure 11:
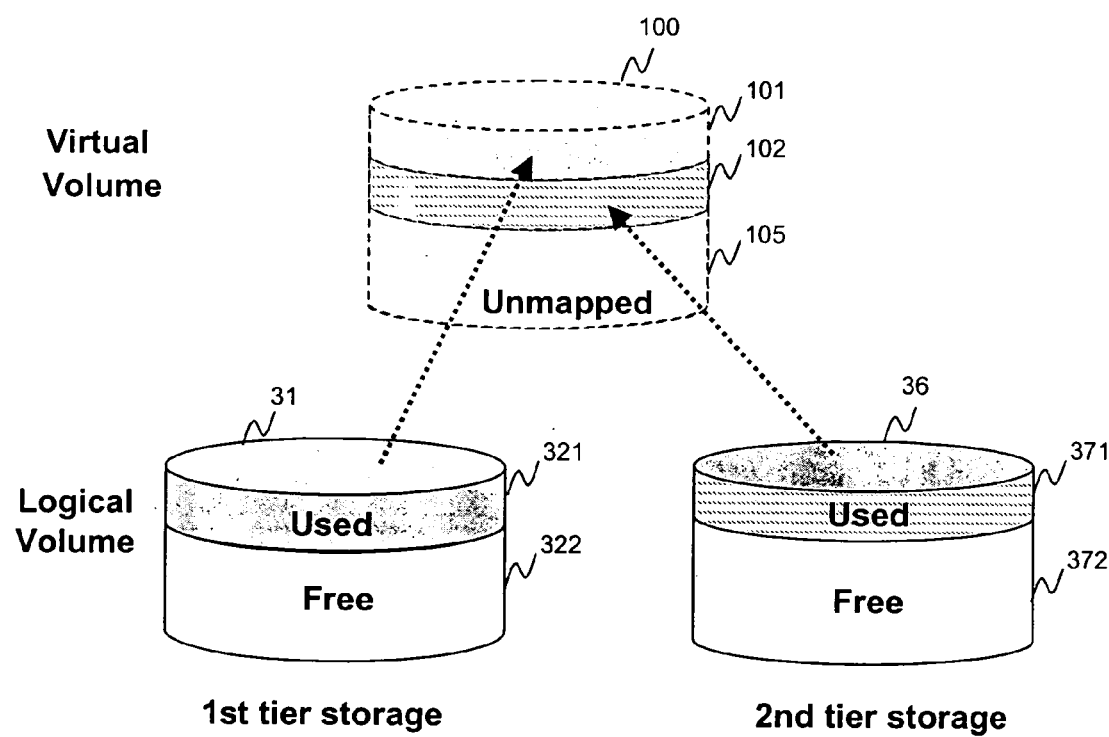
FIG. 11 illustrates a mapping between a plurality of logical volumes and a virtual volume according to one embodiment of the present invention.

FIG. 11 illustrates the mapping between a plurality of logical volumes and a virtual volume according to one embodiment of the present invention. The virtual volume manager 33 in the present embodiment does not map all of the data blocks in the logical volumes 31 and 36 to the virtual volume 100. The data blocks are mapped to the virtual volume 100 only when an access request is received from the local file system 17. In FIG. 11, a region 321 in logical volume 31 and a region 371 in logical volume 36 are mapped to the region 101 and 102 in the virtual volume 100. A region 105 in the virtual volume 100 is not mapped to any data blocks in the logical volumes. If an access request to the region 105 is received, part of free blocks 322 in logical volume 31 is assigned or mapped to the accessed portion of region 105.

Since the data block is dynamically assigned to each of the blocks in the virtual volume 100, the capacity of the virtual volume 100 may exceed the total capacity of the logical volume 31 and 36 if not all region of the virtual volume 100 is used by the local file system 17. However, for simplicity, the capacity of the virtual volume 100 deemed to be equal to the total capacity of the logical volumes 31 and 36.

FIG. 12 illustrates a virtual volume mapping table 400 according to one embodiment of the present invention. Regions of the virtual volume 100 defined by HEAD 401 and TAIL 402 are mapped to regions in the logical volume that are defined by VOL# 403, HEAD 404 and TAIL 405. For example, a record 406 indicates that a virtual region, as defined from 0x00000000 to 0x0001af0f, is mapped to a logical region, defined on Vol. 0 between 0x00000000 to 0x0001af0f. The logical regions in the logical volume that have not been mapped to the virtual volume are not registered in virtual volume mapping table 400. When a given virtual region is accessed and the data blocks in the logical volume is assigned (usually logical volume 31, first tier storage), the mapping information is registered in table 400.

FIG. 13 illustrates a logical volume bitmap 450 according to one embodiment of the present invention. Each logical volume has such a table. The table is used to manage which data blocks are mapped to the virtual volume 100. A BLOCK column 451 indicates the logical block address (LBA) of the logical volume. A FLAG column 452 indicates whether or not a given block is used. An entry of 1 indicates that a flag has been set and the corresponding block is mapped to virtual volume 100. On the other hand, an entry of 0 indicates that the corresponding block is not mapped to virtual volume 100.

Figure 14:
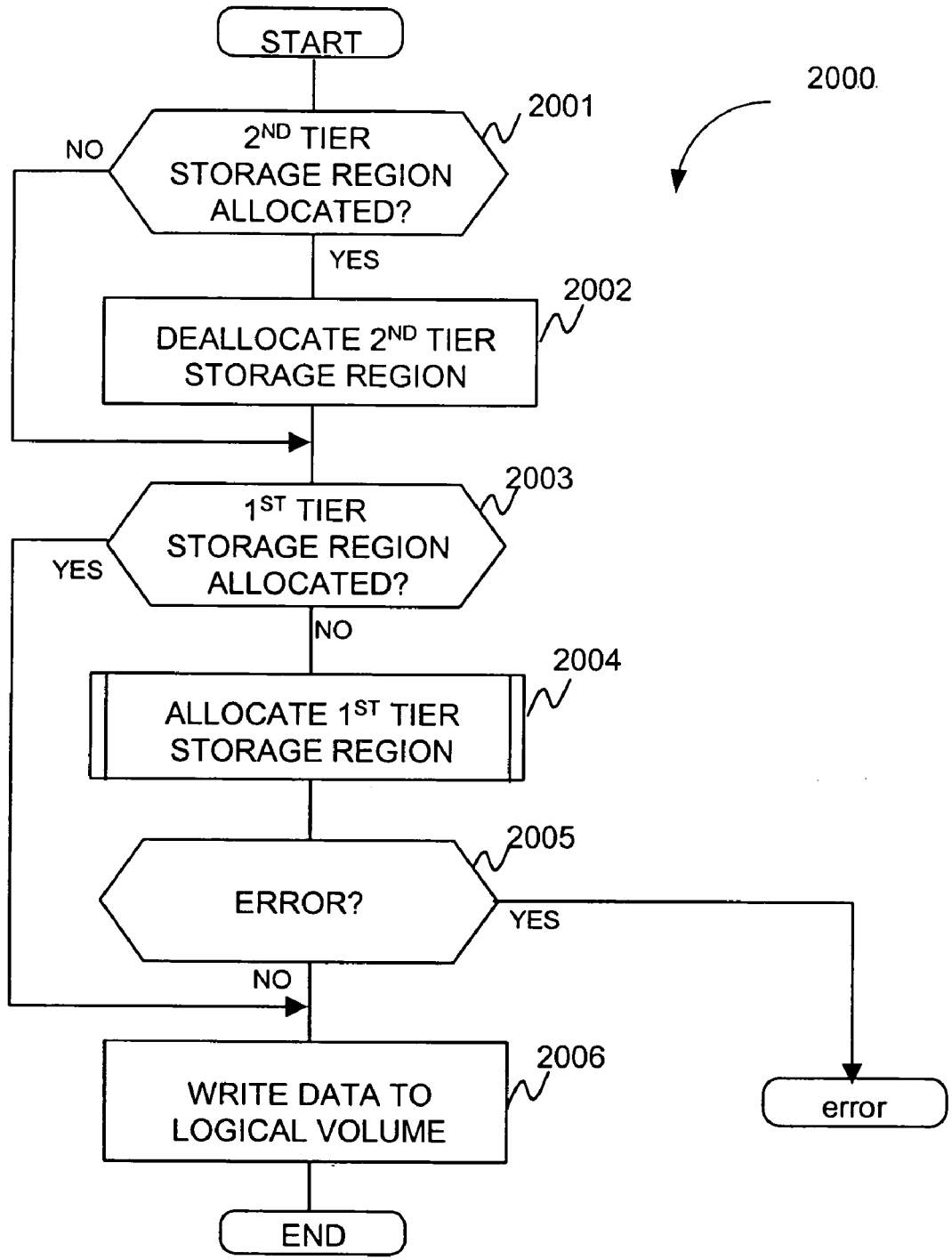
FIG. 14 illustrates a process that is associated with writing data to disk storage by local file system according to one embodiment of the present invention.

FIG. 14 illustrates a process 2000 associated with writing data to disk storage 2 by local file system 17 according to one embodiment of the present invention. The process is performed by virtual volume manager 33 in the present embodiment. In order to write data to disk storage 2, local file system sends the write data and the LBA of the virtual volume 100 to disk storage 2.

At step 2001, virtual volume manager 33 examines the LBA that has been received from local file system 17 and determines whether or not the second tier storage region (i.e. the region in logical volume 36) has been allocated to the virtual region designated by the LBA. If allocated, the process proceeds to step 2002 to end the allocation to the second tier storage region (herein after referred to as "deallocate"). Otherwise, the process proceeds to step 2003.

At step 2002, virtual volume manager 33 deallocates the second tier storage region. This step involves deleting the entry that has been registered in virtual volume mapping table 400 and updating logical volume bitmap 450 of logical volume 36.

At step 2003, virtual volume manager 33 determines whether or not the first tier storage region (i.e. the region in logical volume 31) has been allocated to the designated virtual region. If allocated, the process jumps to step 2006.

Figure 15:
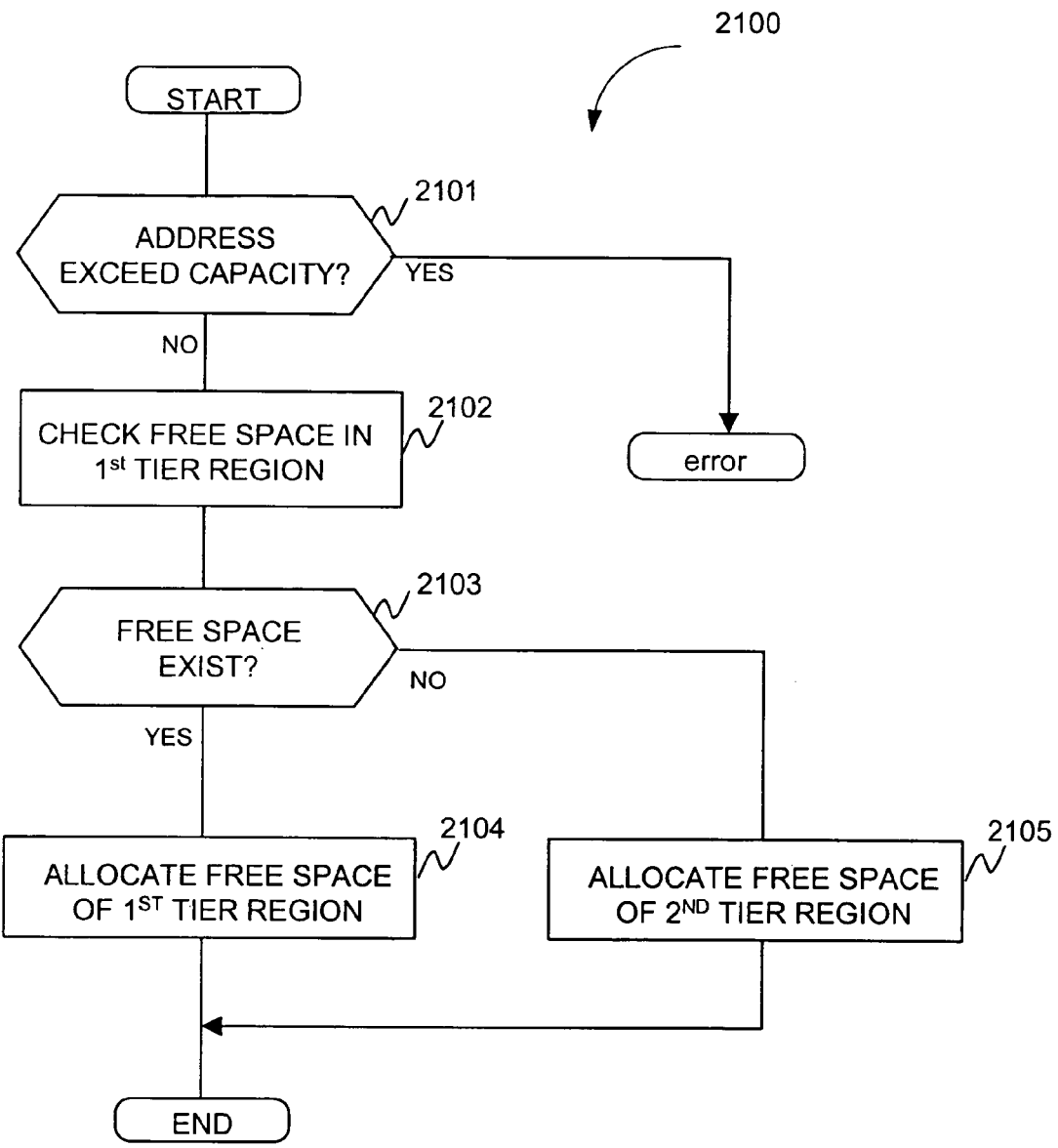
FIG. 15 illustrates a process for allocating a logical volume according to one embodiment of the present invention.

Otherwise, the process proceeds to step 2004. At step 2004, virtual volume manager 33 starts a logical volume allocation process. FIG. 15 illustrates step 2004 in more details.

At step 2005, virtual volume manager determines whether or not the logical volume allocation process has been successfully completed. If error occurred during this logical volume allocation process, process 2000 ends and indicates that an error had occurred.

Otherwise, process 2000 proceeds to step 2006. Virtual volume manager converts the LBA received from the local file system 17 to another LBA in the logical volume, and writes the data to the logical volume (step 2006).

FIG. 15 illustrates a process 2100 for allocating a logical volume according to one embodiment of the present invention. The logical volume allocation process 2100 is performed corresponds to step 2004 in FIG. 14.

At step 2101, virtual volume manager 33 examines whether or not the LBA designated by local file system 17 indicates a block address that exceeds the capacity of the virtual volume 100. If so, the process ends and returns an error message to process 2000. As a result, process 2000 also issues an error message and terminates (see step 2005).

Otherwise, process 2100 proceeds to step 2102. Virtual volume manager 33 checks for free space in the first tier storage region, i.e. logical volume 31, (step 2102). This step involves checking logical volume bitmap 450 of logical volume 31. If free space exists in the first tier storage region, the process proceeds to step 2104 (step 2103). If not, the process goes to step 2105.

At step 2104, virtual volume manager 33 allocates a certain portion (or free data blocks) of the free space in the first tier storage region to the virtual volume 100. The size of the free data block to be allocated to the virtual volume 100 corresponds to the size of the write data received (or to be received) from the local file system 17. The size of the allocated, free data blocks needs to be equal to or greater than the size of the write data.

At step 2105, the virtual volume manger allocates a certain portion of free space in the second tier storage region to the virtual volume 100. The size for allocating to the virtual volume corresponds to the size of the write data from the local file system 17.

Figure 16:
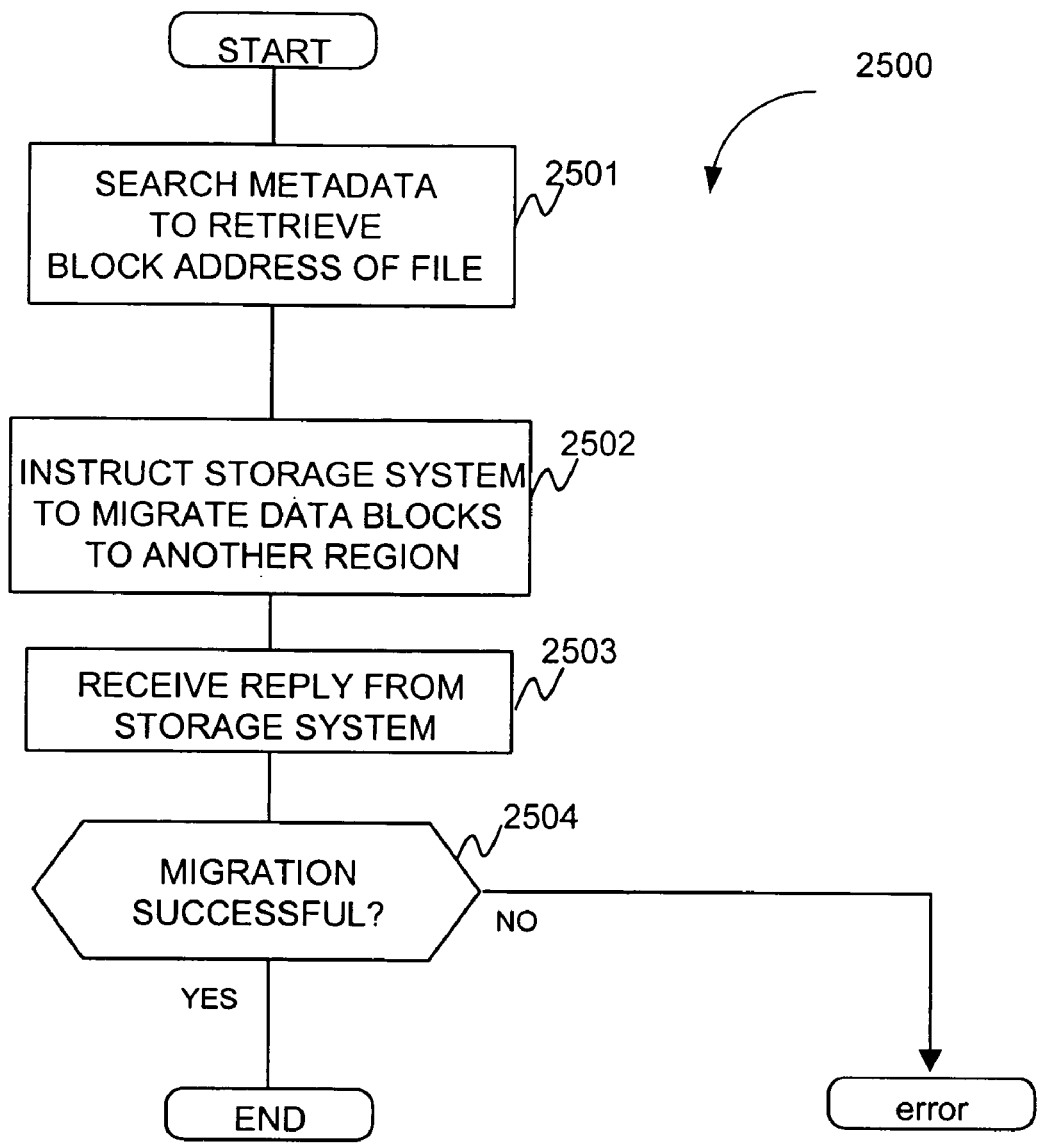
FIG. 16 illustrates show a process for migrating a file from a first tier storage region to a second tier according to one embodiment of the present invention.

FIG. 16 illustrates a process 2500 for migrating a file from a first tier storage region to a second tier according to one embodiment of the present invention. Process 2500 is performed by file migration program 15 when it receives a migration request from application program 16.

At step 2501, file migration program 15 searches metadata to retrieve the LBA information of the file that is to be migrated. File migration program 15 provides the LBA information and instructs disk storage 2 to migrate the corresponding data blocks to a second tier storage region (step 2502). A reply message is received from the disk storage (step 2503). The reply indicates whether or not the migration has been successful.

At step 2504, if the reply received is not an error message, application program 16 is notified that process 2500 has been successfully completed. If the reply is an error message, the process sends an error message to application program 16.

Figure 17:
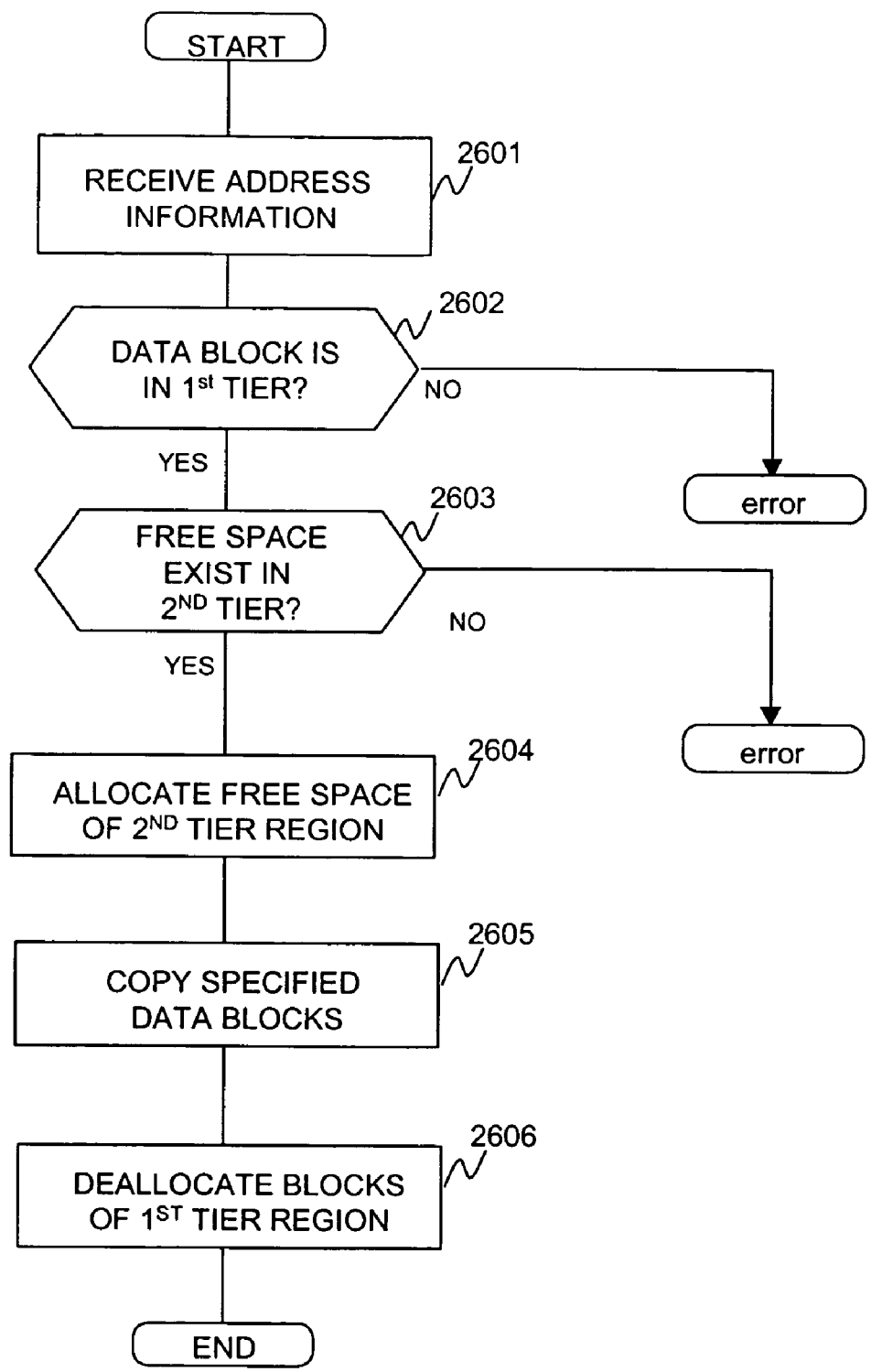
FIG. 17 illustrates show a process for migrating a file from a first tier storage region to a second tier according to another embodiment of the present invention.

FIG. 17 illustrates a process 2600 for migrating a file from a first tier storage region to a second tier according to another embodiment of the present invention. Process 2600 is performed by virtual volume manager 33. When the file migration program 15 instructs disk storage 2 to migrate a file at step 2502, the virtual volume manager 33 starts the migration process below.

At step 2601, virtual volume manager 33 receives the LBA information of the virtual volume 100 from the file migration program 15. The virtual volume manger 33 checks to determine whether or not the data block corresponding to the received LBA information are in the first tier storage region (step 2602). If they are in the first tier, process 2600 proceeds to step 2603. Otherwise, the process ends since file migration is not necessary. The process also sends an error message to file migration program 15 stating that the data are already in the second tier storage region. In the present embodiment, this checking step is performed in disk storage 2, e.g., by virtual volume manager 33, since local file system 17 and file migration program 15 in the file server do not know which data blocks in the virtual volume 100 are in the first and second tier storage regions.

At step 2603, virtual volume manger 33 determines whether or not there is sufficient free space in the second tier storage region. If so, the process proceeds to step 2604. Otherwise, the process returns an error message to file migration program 15.

Virtual volume manger 33 allocates a certain portion (i.e., free data blocks) of the second tier storage region (step 2604). Logical volume bitmap 450 of logical volume 36 is updated to reflection the allocation.

The virtual volume manger 33 instructs data migration program 30 to copy the data stored in the data blocks of the first tier storage region, i.e., that corresponding to the LBA information received from the file migration program 15, to the newly allocated data blocks in the second tier storage region (step 2605).

The virtual volume manger 33 maps the allocated data blocks in the second tier storage region to the virtual volume 100 (step 2606). That is, the data blocks in the first tier storage regions that were formerly mapped to the virtual volume 100 are deallocated. Virtual volume mapping table 400 and logical volume bitmap 450 of logical volume 31 are updated accordingly.

Figure 19:
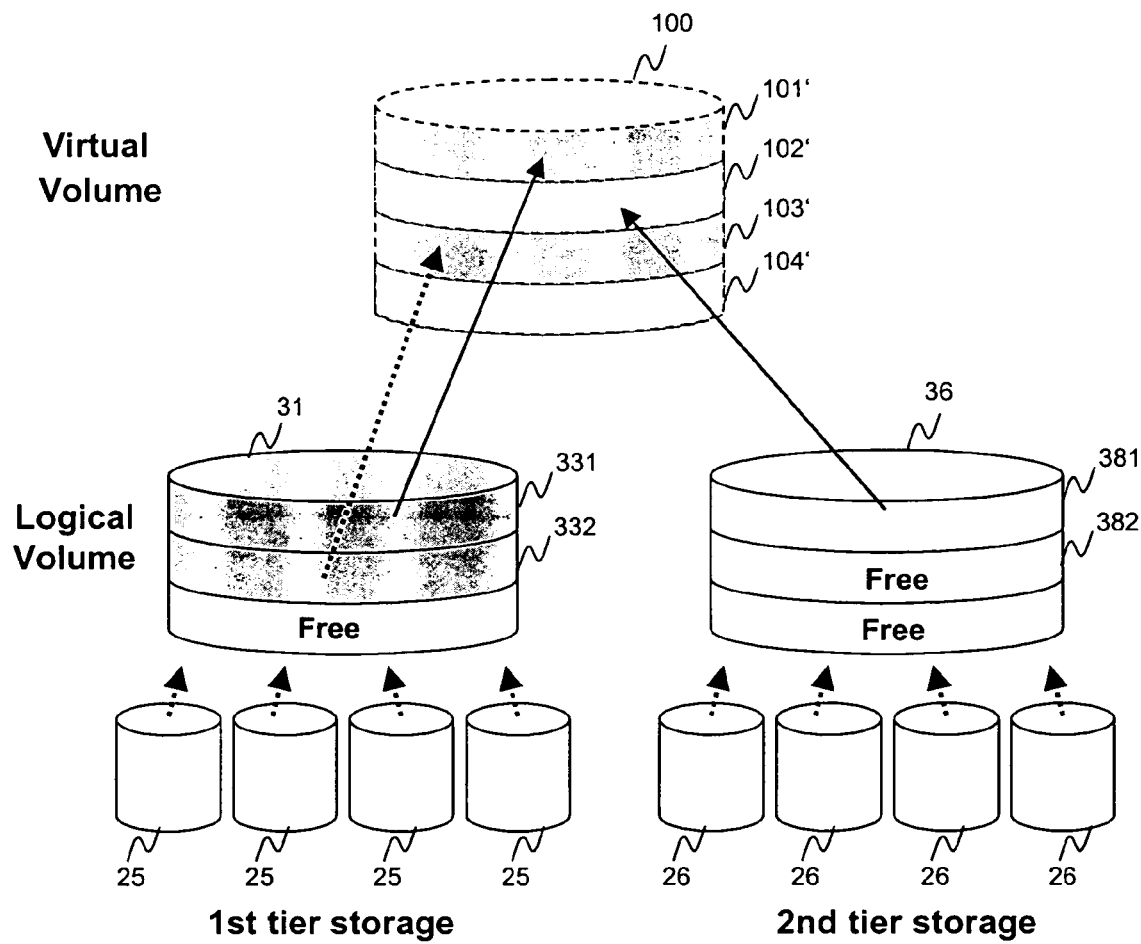
FIGS. 19 and 20 graphically illustrate the change of mapping between the virtual volume and the logical volumes when a file is migrated.
Figure 20:
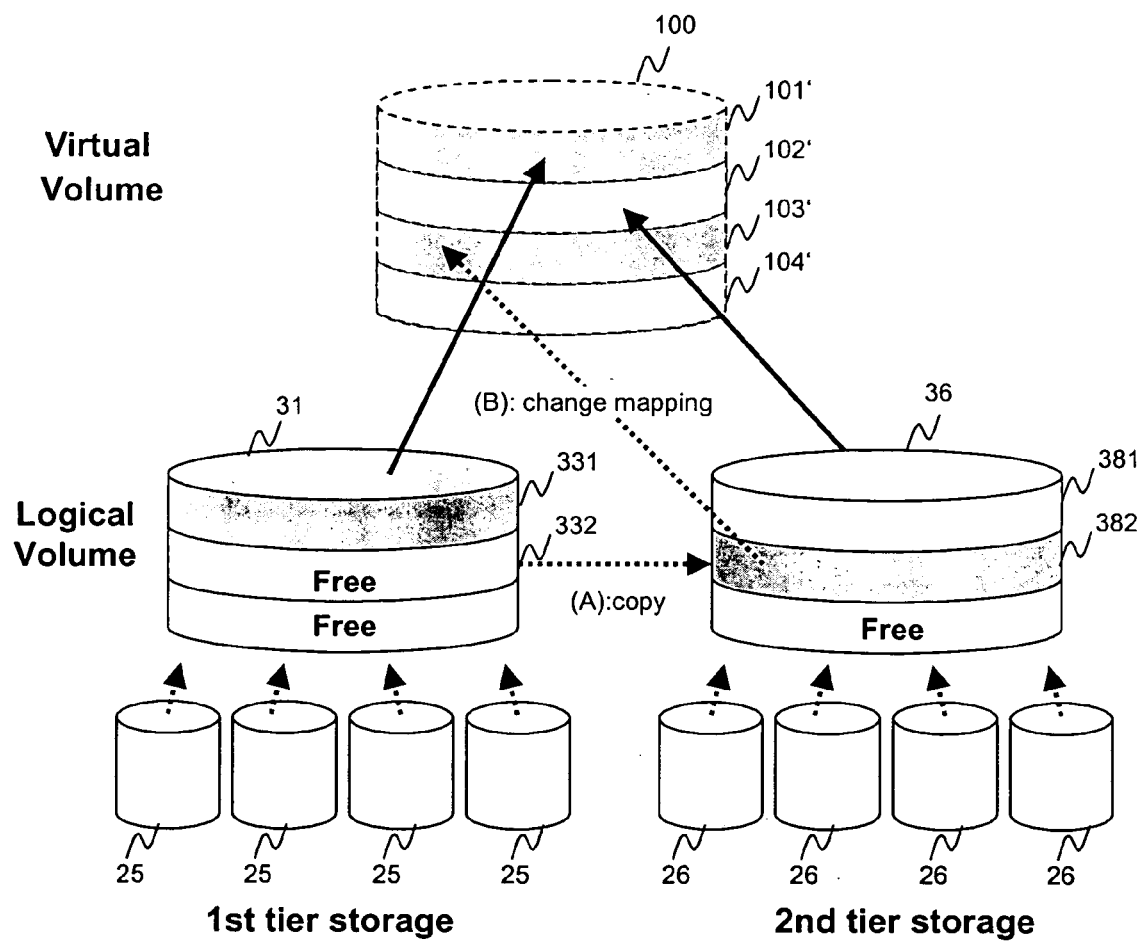

FIGS. 19 and 20 graphically illustrate the change of mapping between the virtual volume 100 and the logical volumes 31 and 36 when a file is migrated. FIG. 19 illustrates a state prior to the file migration, where a region 332 in logical volume31 is mapped to a third region 103' in virtual volume 100. FIG. 20 illustrates a state after the file migration, the data in the third region 103' is migrated from the region 332 to a region 382. That is, when a file migration process, e.g., process 2600, is first executed, the region 382 in the logical volume 36 are free blocks (FIG. 19). Thereafter, region 382 is allocated or made available for a copy operation (corresponds to step 2604), as shown in FIG. 20. The data in region 332 are then copied to region 382 (corresponds to step 2605). Region 382 is mapped to the virtual volume, and region 332 is deallocated and freed (corresponds to step 2606).

In the present embodiment, when a file is written to virtual volume 100, it is written to a given portion of the first tier storage region (i.e. logical volume 31). Later if the file is migrated to a second tier storage region, that portion of the first tier storage region is unmapped from the virtual volume 100, so that it may be reused for storing another file.

On the other hand, if the file is deleted before being migrating to the second tier storage region, the first tier storage region is left in unused state from the perspective of local file system 17. Although the given portion of the first tier storage region is kept mapped to virtual volume 100 and is free to store data, the given portion would not be used to store a new file since local file system 17 does not know which region belong to the first tier region. This results in waste of the first tier storage. To reduce such a waste of the first tier storage, the HSM system 9 is provided with a "free space cleaning" function according to one embodiment of the present invention. This function is used to unmap the unused first tier storage region from virtual volume 100.

Figure 18:
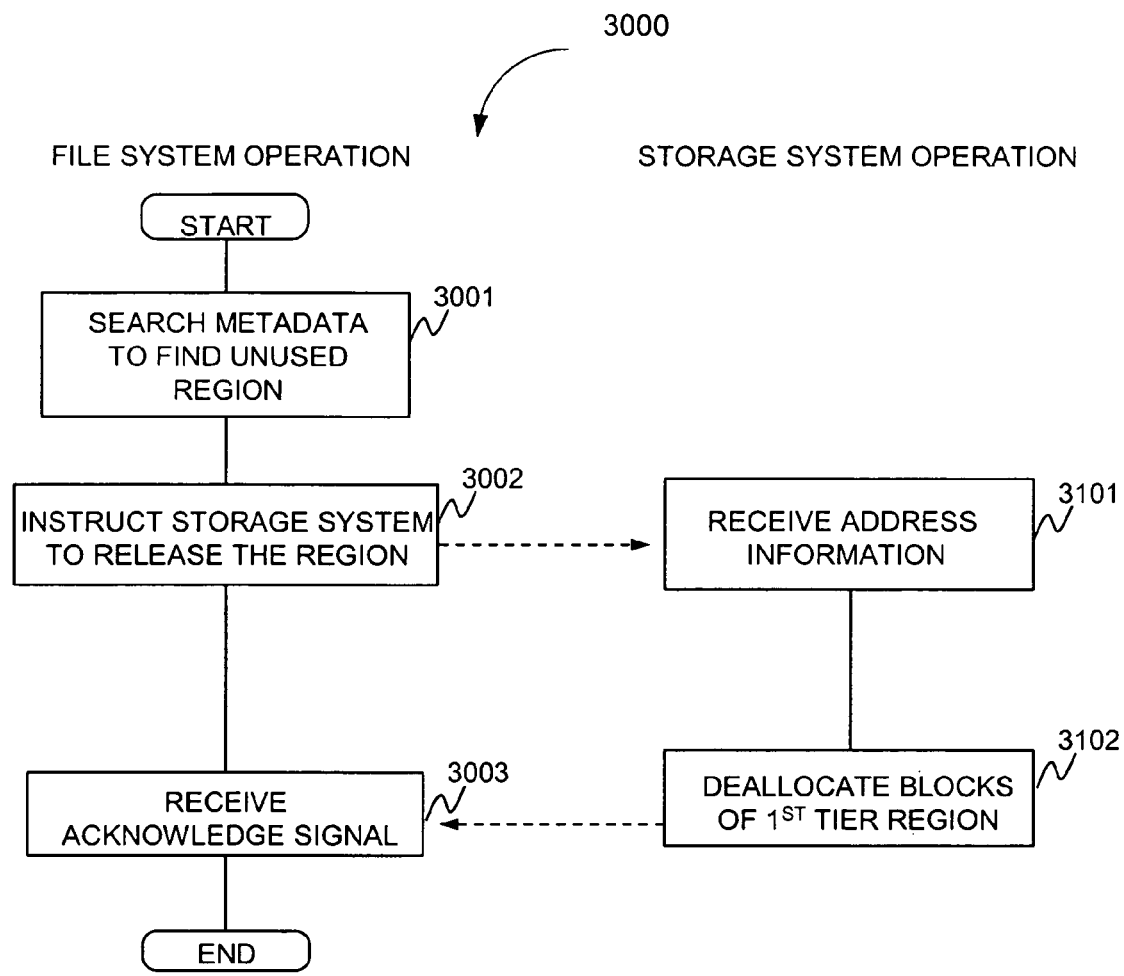
FIG. 18 illustrates a process relating to a free space cleaning function according to one embodiment of the present invention.

FIG. 18 illustrates a process 3000 relating to a free space cleaning function according to one embodiment of the present invention. File migration program 15 and virtual volume manager 33 together perform this process. At step 3001, file migration program 15 searches block bitmap 112 in the metadata to find unused data addresses in virtual volume 100. File migration program 15 forwards any unused data address that has been located to disk storage 2 and instructs disk storage 2 to release the corresponding region, i.e., unmap the data block from virtual volume 100, (step 3002). Disk storage 2 receives the unused data address and instruction from file migration program 15 (step 3001). If a portion of the first tier storage region (logical volume 31) is mapped to the address received from file migration program 15, virtual volume manager 33 deallocates or frees that portion of the first tier storage region from virtual volume 100 and notifies the file migration program (step 3102). File migration program 15 receives the notification and ends process 3000 (step 3003)

The present invention has been described in terms of specific embodiments. The specific embodiments above may be modified or changed without departing from the scope of the present invention. For example, the first and second tier storage regions may be defined using entirely different media, e.g., disks for first tier and tapes for second tier, or three or more storage tiers may be defined.

Figure 21:
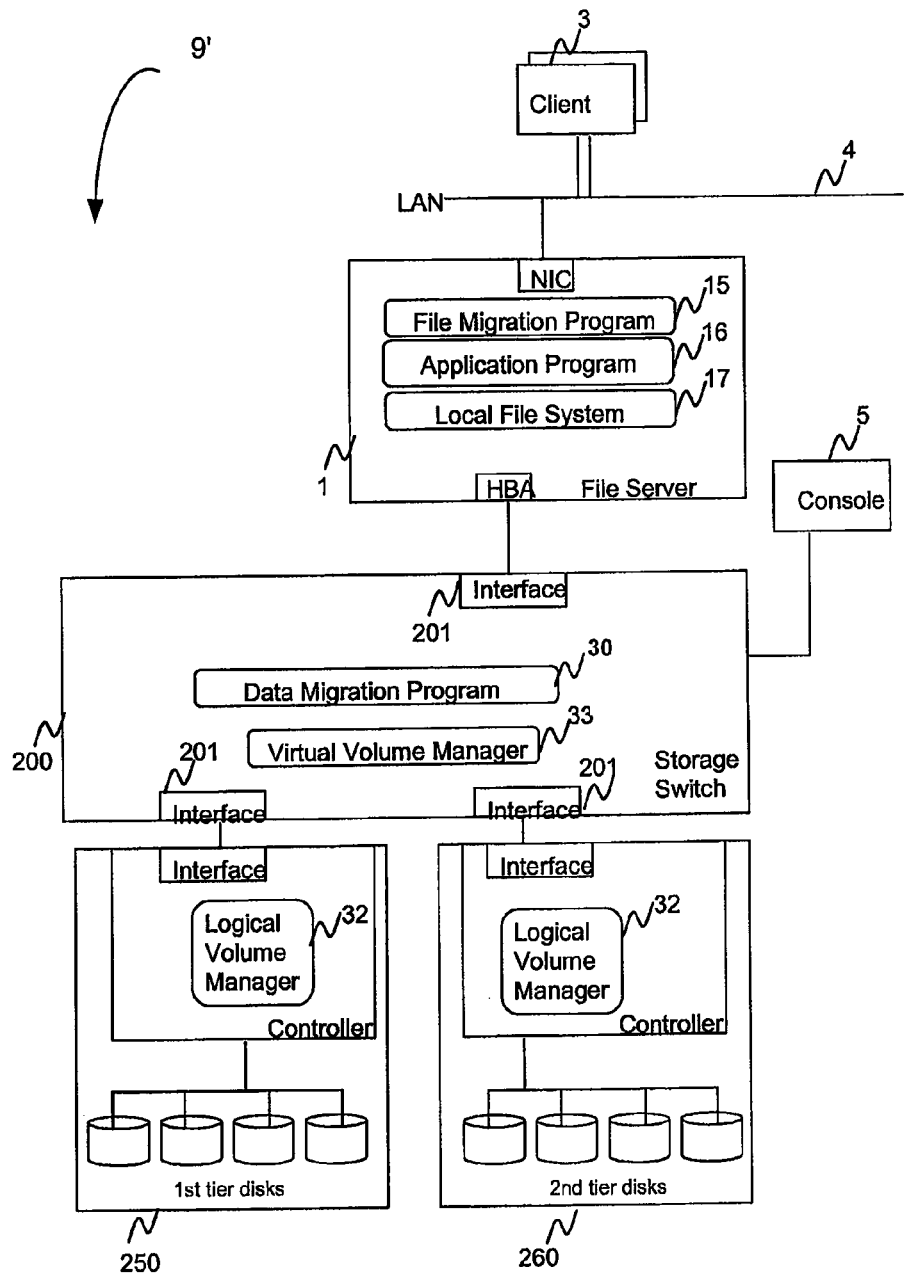
FIG. 21 illustrates a hierarchical storage management (HSM) system including two disk storage units or systems, where the first tier disks are located in one disk storage system and the second tier disks are located in another storage system, according to one embodiment of the present invention.

Alternatively, different tiers of storage may be provided in different storage units rather than within a single storage unit. FIG. 21 illustrates a hierarchical storage management (HSM) system 9' including two disk storage units or subsystems, where the first tier disks are located in one disk storage unit 250 and the second tier disks are located in another storage unit 260. The HSM system 9 includes a file server 1, a storage switch 200, one or more clients 3, a local area network 4, and a console 5. Storage switch 200 may be a Fibre Channel switch or Ethernet switch, or the like. Switch 200 includes a virtual volume manager 33' and data migration program 30. Virtual volume manager 33' creates one or more virtual volumes by using logical volumes provided by disk storage units 250 and 260. These virtual volumes are then presented to file server 1.

Figure 22:
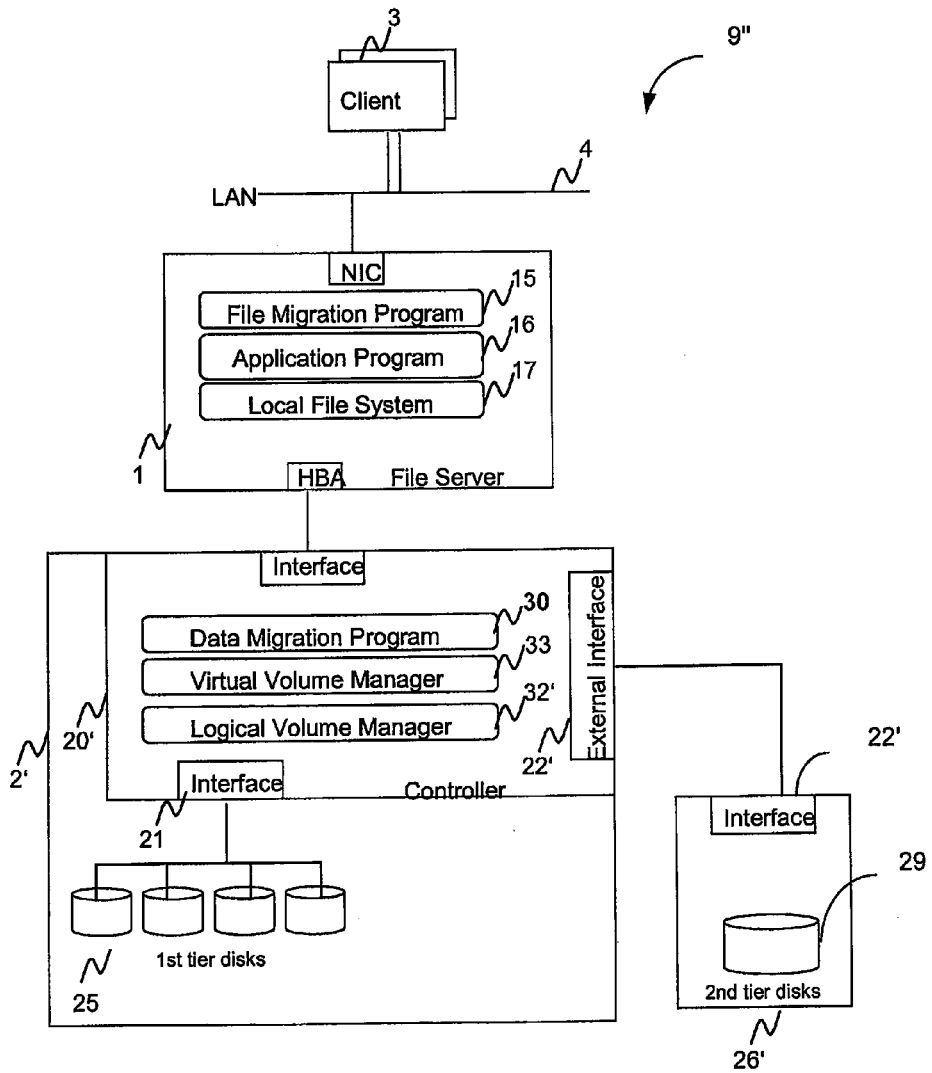
FIG. 22 illustrates a hierarchical storage management (HSM) system, where the second tier disks are remotely located from a disk storage system, according to one embodiment of the present invention.

FIG. 22 illustrates a hierarchical storage management (HSM) system 9'', where the second tier disks 29 are remotely located from a disk storage system 2. The disk storage system 2' is coupled to a remote disk unit 26' including the second tier disks via interfaces 22'. A logical volume manager 32' of disk storage 2' treats the volumes in remote disk unit 26' as if they are provided in disk storage 2'. Virtual volume manager 33, provided within the disk storage 2, creates one or more virtual volumes using the logical volumes made of first tier disks 25 and second tier disks 29 in the remote disk unit.

As illustrated, the present invention may be implemented and worked in many different ways. Accordingly, the embodiments/implementations illustrated above should not be used to limit the scope of the present invention. Rather the scope of the present invention should be interpreted based on the appended claims.

What is claimed is:

1. A method for managing a hierarchical storage system including a first storage unit, the first storage unit including a storage area to store data, a storage controller to control access to the storage area, and a communication interface to communicate with a file server, the method comprising:

receiving an instruction from a file migration program of the file server to migrate a first file stored in a first portion of a first tier storage region defined by one or more first tier physical storage devices, the first tier storage region including a different portion for storing a second file therein;

determining a first storage address corresponding to the first portion of the first tier storage region; and copying data stored at the first storage address to a second storage address corresponding to a second portion of a second tier storage region defined by one or more second tier physical storage devices, wherein the first and second tier physical storage devices provide different performance characteristics, wherein the second file remains in the first tier storage region and is not migrated to the second tier storage region, wherein the first tier storage region corresponds to a first logical volume and contains the first storage address, and the second tier storage region corresponds to a second logical volume and contains the second storage address;

wherein both the first tier storage region and the second tier storage region are mapped to a virtual volume according to a virtual volume manager and wherein copying the data from the first tier storage region to the second tier storage region is performed according to a data migration program of the storage controller; and wherein the first logical volume is defined by the one or more first tier physical storage devices, and the second logical volume is defined by the one or more second tier physical storage devices, the virtual volume comprising an address space independent of address spaces of the first or second logical volumes, wherein contiguous ranges of the address space of the virtual volume each maps to an address space of one of the first or second logical volumes, and wherein a mapping is maintained of data blocks in the address space of the virtual volume to the address space of the logical volumes.

2. The method of claim 1, wherein the first and second tier storage devices are located within the first storage unit.

3. The method of claim 1, wherein the one or more first tier physical storage devices communicate with the storage controller via a first interface, and the one or more second tier physical storage devices communicate with the storage controller via a second interface, the first and second interfaces contributing to the different performance characteristics of the first and second tier physical storage devices.

4. The method of claim 1, wherein the first logical volume is defined by the one or more first tier physical storage devices having relatively high performance characteristics, and the second logical volume is defined by the one or more second tier physical storage devices having relatively low performance characteristics.

5. The method of claim 1, wherein the hierarchical storage system is the first storage unit that is a disk array unit, the first storage unit including of a plurality of disk drives, the plurality of disk drives including first disk drives and second disk drives, the one or more first tier storage devices corresponding the first disk drives and the one or more second tier storage devices corresponding to the second disk drives.

6. The method of claim 1, wherein the migration instruction is issued by a file migration program residing in the file server to a virtual volume manager.

7. The method of claim 6, wherein the virtual volume manager resides in the first storage unit or the file server, and the storage address is a logical block address.

8. The method of claim 6, the method further comprising: providing a second address corresponding to the second portion of the second tier storage region to the virtual volume manager by the file server, so that the virtual volume manger may copy the first file to the second portion of the second tier storage region.

9. The method of claim 1, wherein the migration instruction is issued by the file server to the storage controller via the communication interface, the migration instruction being issued by a user.

10. The method of claim 1, wherein the migration instruction is issued by the file server to the storage controller via the communication interface, the migration instruction being issued according to a predefined policy.

11. The method of claim 10, wherein the predefined policy is associated with a threshold value managed by a file migration program residing in the file server.

12. The method of claim 11, wherein the threshold value relates to information on storage usage or file access time.

13. The method of claim 1, wherein the first tier storage region is a first virtual region of a virtual volume and the second tier storage region is a second virtual region of the virtual volume, the first and second virtual regions being mapped to first and second logical volumes, respectively, wherein the first logical volume is defined by the one or more first tier physical storage devices having relatively high performance characteristics, and the second logical volume is defined by the one or more second tier physical storage devices having relatively low performance characteristics, the method further comprising:
receiving a write request from the file server by the storage controller, the write request relating to the first file;
allocating a portion the first logical volume in response to the write request;
writing data corresponding to the first file to the portion of the first logical volume that has been allocated; and
mapping the portion of the first logical volume to the first portion of the first tier storage region.

14. The method of claim 13, wherein the second file contains data that is more important than data in the first file.

15. The method of claim 1, wherein the system includes a second storage unit, the second tier physical storage unit being included in the second storage unit.

16. The method of claim 1, wherein the first tier storage region is a first virtual region of a virtual volume and the second tier storage region is a second virtual region of the virtual volume, the first and second virtual regions being mapped to first and second logical volumes, respectively, wherein the first logical volume is defined by the one or more first tier physical storage devices having relatively high performance characteristics, and the second logical volume is defined by the one or more second tier physical storage devices having relatively low performance characteristics, the method further comprising:
allocating the second portion of the second tier storage region, so that the first file may be migrated to the second portion;
mapping the allocated second portion to the virtual volume; and
deallocating the first portion of the first tier storage region after the first file has been migrated to the second portion of the second tier storage region.

17. The method of claim 16, further comprising:
searching for any portion of the virtual volume that is not being used to store active data;
locating an unused portion of the virtual volume;
instructing the storage controller to release the unused portion of the virtual volume, so that the unused portion would not be mapped to the virtual volume.

18. The method of claim 16, wherein the second file contains data that is more important than data in the first file.

19. The method of claim 1, wherein the one or more first tier physical devices provide higher performance characteristics than the one or more second tier physical devices, and wherein the second file contains data that is more important than data in the first file.

20. The method of claim 1, wherein the second file contains data that is more important than data in the first file.

21. The method of claim 1, wherein the virtual volume manager updates the data block mapping in accordance with logical block address information received from the file server.

22. A method for managing a hierarchical storage system including a storage unit, the storage unit including a storage area to store data, a storage controller to control access to the storage area, and a communication interface to communicate with a file server, the method comprising:
receiving an instruction from a file migration program of the file server to migrate a first file stored at a first storage address corresponding to a first virtual region of a virtual volume, the first storage address of the first virtual region being mapped to a first logical address of a first logical volume that is defined by one or more physical storage devices of a first type, the first virtual region further storing a second file therein;
migrating the first file to a second logical volume corresponding to a second logical address, the second logical address of the second logical volume being mapped to a second virtual region of the virtual volume, the second logical volume being defined by one or more physical storage devices of a second type, the physical storage devices of the first and second types providing different performance characteristics; and
updating metadata of the virtual volume to reflect the migration of the first file to the second logical volume, wherein migrating the first file to the second logical volume and updating the metadata are performed according to a data migration program of the storage controller;
wherein the second file remains in the first virtual region and is not migrated to the second virtual region with the first file,
wherein both the first tier storage region and the second tier storage region are mapped to a virtual volume according to a virtual volume manager; and
the virtual volume comprising an address space independent of address spaces of the first or second logical volumes, wherein contiguous ranges of the address space of the virtual volume each maps to an address space of one of the first or second logical volumes, and wherein a mapping is maintained of data blocks in the address space of the virtual volume to the address space of the logical volumes.

23. The method of claim 22, wherein the one or more physical devices of the first type provide higher performance characteristics than the one or more physical devices of the second type, and wherein the second file contains data that is more important than data in the first file.

24. The method of claim 22, wherein the virtual volume manager updates the data block mapping in accordance with logical block address information received from the file server.

25. A hierarchical storage system, comprising:
a storage unit, the first storage unit including a storage area defined by a plurality of disks and a storage controller to control access to the storage area; and
a file server coupled to the storage unit via a communication interface and configured to issue requests to the storage unit;
wherein the storage unit includes
means for receiving a request from the file server to migrate a first file stored in a first portion of a first tier storage region defined by one or more first tier disks, the first tier storage region including a different portion for storing a second file therein;
means for determining a first storage address corresponding to the first portion of the first tier storage region; and
means for copying data stored at the first storage address to a second storage address corresponding to a second portion of a second tier storage region defined by one or more second tier physical storage devices;
wherein the first and second tier physical storage devices provide different performance characteristics, and
wherein the second file remains in the first tier storage region and is not migrated to the second tier storage region,
wherein the first tier storage region corresponds to a first logical volume and contains the first storage address, and the second tier storage region corresponds to a second logical volume and contains the second storage address;
wherein both the first tier storage region and the second tier storage region are mapped to a virtual volume according to a virtual volume manager and wherein the means for copying data performs the copying according to a data migration program of the storage controller; and
wherein the first logical volume is defined by the one or more first tier physical storage devices, and the second logical volume is defined by the one or more second tier physical storage devices,
the virtual volume comprising an address space independent of address spaces of the first or second logical volumes, wherein contiguous ranges of the address space of the virtual volume each maps to an address space of one of the first or second logical volumes, and wherein a mapping is maintained of data blocks in the address space of the virtual volume to the address space of the logical volumes.

26. The hierarchical storage system of claim 25, wherein the file server is remotely located from the storage unit or provided within the same housing.

27. The system of claim 25, wherein the one or more first tier physical devices provide higher performance characteristics than the one or more second tier physical devices, and wherein the second file contains data that is more important than data in the first file.

28. The system of claim 25, wherein the virtual volume manager updates the data block mapping in accordance with logical block address information received from the file server.

29. A disk array unit, comprising:
a storage area defined by a plurality of storage disks;
a storage controller to manage the storage disks and communicate with a remote computer via a communication interface, the remote computer configured to issue access requests to the disk array unit;
means for receiving an instruction from the remote computer to migrate a first file stored at a first storage address corresponding to a first virtual region of a virtual volume, the first storage address of the first virtual region being mapped to a first logical address of a first logical volume that is defined by one or more physical storage devices of a first type, the first virtual region further storing a second file therein, wherein the mapping of the virtual region;
means for migrating the first file to a second logical volume corresponding to a second logical address, the second logical address of the second logical volume being mapped to a second virtual region of the virtual volume, the second logical volume being defined by one or more physical storage devices of a second type, the physical storage devices of the first and second types providing different performance characteristics; and
means for updating metadata of the virtual volume to reflect the migration of the first file to the second logical volume,
wherein the mapping of the first and second virtual regions to the respective logical volumes is performed according to a virtual volume manager and wherein migrating the data from the first virtual region to the second virtual region is performed according to a data migration program of the storage controller
wherein the second file remains in the first virtual region and is not migrated to the second virtual region with the first file,
the virtual volume comprising an address space independent of address spaces of the first or second logical volumes, wherein contiguous ranges of the address space of the virtual volume each maps to an address space of one of the first or second logical volumes, and wherein a mapping is maintained of data blocks in the address space of the virtual volume to the address space of the logical volumes.

30. The disk array unit of claim 29, wherein the one or more physical devices of the first type provide higher performance characteristics than the one or more physical devices of the second type, and wherein the second file contains data that is more important than data in the first file.

31. The disk array unit of claim 29, wherein the virtual volume manager updates the data block mapping in accordance with logical block address information received from the file server.

32. A computer readable medium including a computer program for managing a hierarchical storage system, the hierarchical storage system including a first storage unit, the first storage unit including a storage area to store data, a storage controller to control access to the storage area, and a communication interface to communicate with a file server, the computer program comprising:
code for receiving an instruction from the file server to migrate a first file stored in a first portion of a first tier storage region defined by one or more first tier physical storage devices, the first tier storage region including a different portion for storing a second file therein;
code for determining a first storage address corresponding to the first portion of the first tier storage region; and
code for copying data stored at the first storage address to a second storage address corresponding to a second portion of a second tier storage region defined by one or more second tier physical storage devices, wherein the first and second tier physical storage devices provide different performance characteristics, and wherein the second file remains in the first tier storage region and is not migrated to the second tier storage region, wherein the first tier storage region corresponds to a first logical volume and contains the first storage address, and the second tier storage region corresponds to a second logical volume and contains the second storage address;

wherein both the first tier storage region and the second tier storage region are mapped to a virtual volume according to a virtual volume manager and wherein copying the data from the first tier storage region to the second tier storage region is performed according to a data migration program of the storage controller; and wherein the first logical volume is defined by the one or more first tier physical storage devices, and the second logical volume is defined by the one or more second tier physical storage devices, the virtual volume comprising an address space independent of address spaces of the first or second logical volumes, wherein contiguous ranges of the address space of the virtual volume each maps to an address space of one of the first or second logical volumes comprising the virtual volume, and wherein a mapping is maintained of data blocks in the address space of the virtual volume to the address space of the logical volumes.

33. The computer readable medium of claim 32, wherein the one or more first tier physical devices provide higher performance characteristics than the one or more second tier physical devices, and wherein the second file contains data that is more important than data in the first file.

34. The computer readable medium of claim 32, wherein the virtual volume manager updates the data block mapping in accordance with logical block address information received from the file server.

* * * * *